US008445779B1

(12) United States Patent
Gretz

(10) Patent No.: US 8,445,779 B1
(45) Date of Patent: May 21, 2013

(54) TWO GANG ELECTRICAL BOX FOR RAPID MOUNTING USING HOLE SAW

(75) Inventor: Thomas J. Gretz, Port. St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 405 days.

(21) Appl. No.: 12/924,882

(22) Filed: Oct. 7, 2010

Related U.S. Application Data

(63) Continuation-in-part of application No. 12/319,648, filed on Jan. 9, 2009, now Pat. No. 8,063,302, which is a continuation-in-part of application No. 12/012,907, filed on Feb. 6, 2008, now Pat. No. 7,759,576, which is a continuation-in-part of application No. 12/008,120, filed on Jan. 9, 2008, now Pat. No. 7,586,039.

(51) Int. Cl.
*H01H 9/02* (2006.01)

(52) U.S. Cl.
USPC .............. 174/53; 174/58; 174/50; 174/480; 220/3.2; 220/3.3; 220/4.02

(58) Field of Classification Search
USPC .................. 174/50, 53, 57, 58, 480, 481, 63, 174/61; 220/3.2–3.9, 4.02; 439/535, 536, 439/949
See application file for complete search history.

(56) References Cited

U.S. PATENT DOCUMENTS

| | | | | |
|---|---|---|---|---|
| 4,265,365 A | * | 5/1981 | Boteler | 220/3.3 |
| 4,304,957 A | * | 12/1981 | Slater et al. | 174/58 |
| 4,328,903 A | | 5/1982 | Baars | |
| 4,978,318 A | | 12/1990 | Wiley et al. | |
| 5,135,411 A | | 8/1992 | Wiley et al. | |
| 5,434,359 A | | 7/1995 | Schnell | |
| 6,508,445 B1 | | 1/2003 | Rohmer | |
| 7,300,025 B2 | * | 11/2007 | Korcz | 248/56 |
| 7,525,043 B1 | * | 4/2009 | Gretz | 174/50 |
| 8,148,634 B1 | * | 4/2012 | Gretz | 174/50 |

* cited by examiner

*Primary Examiner* — Angel R Estrada

(57) ABSTRACT

A two gang electrical box that greatly reduces the time and effort required to mount one or two electrical components to a wall or similar surface. Wall preparation requires only the use of a standard hole saw thereby greatly minimizing installation time. The two gang electrical box includes a plate with an opening therein and a substantially circular sidewall extending from the plate at the periphery of the opening and terminating in a rear wall. Mounting fasteners extending through the plate include clamp arms thereon for securing the electrical box to a wall. The clamp arms can be rotated to either an inward position or an outward position. The sidewall is provided with open areas or recesses to fully accommodate the clamp arms when rotated to the inward position thereby enabling the peripheral wall and clamp arms to pass easily within the wall opening created by the standard size hole-saw.

14 Claims, 23 Drawing Sheets

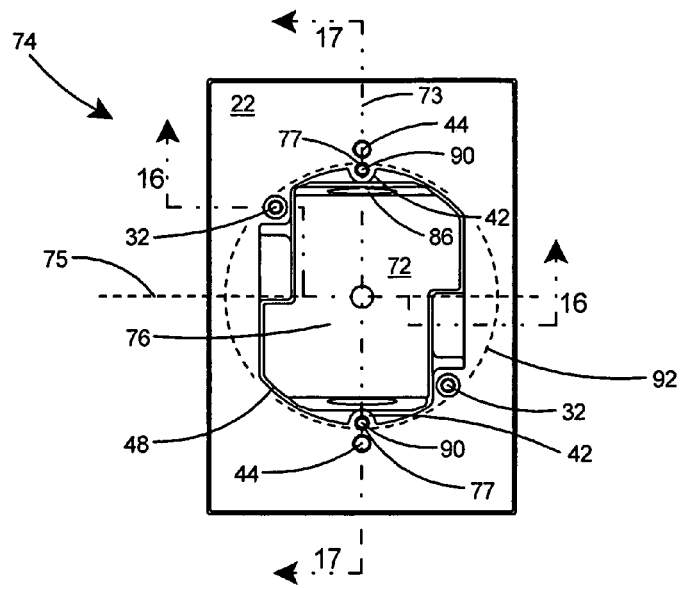
Fig. 15
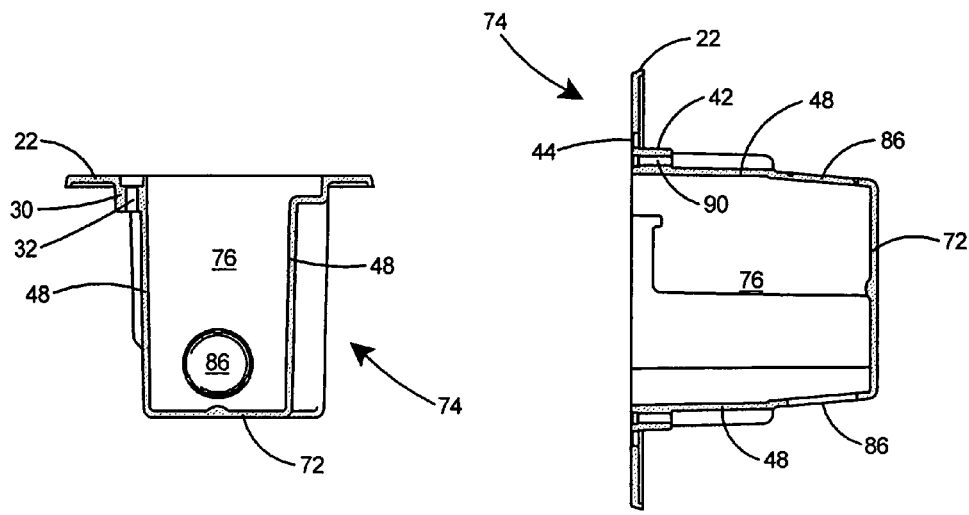
Fig. 16
Fig. 17

TWO GANG ELECTRICAL BOX FOR RAPID MOUNTING USING HOLE SAW

This application is a Continuation-In-Part of U.S. patent application Ser. No. 12/319,648 filed Jan. 9, 2009 now U.S. Pat. No. 8,063,302, which is a Continuation-In-Part of U.S. patent application Ser. No. 12/012,907 filed Feb. 6, 2008 and now U.S. Pat. No. 7,759,576, which is also a Continuation-In-Part of U.S. patent application Ser. No. 12/008,120 filed Jan. 9, 2008 and now U.S. Pat. No. 7,586,039, all of which are incorporated herein in their entireties by reference thereto.

FIELD OF THE INVENTION

This invention relates to electrical boxes for mounting one or more high or low voltage electrical components or a light fixture to a wall and specifically to an electrical box or frame member with retractable clamp arms for rapid mounting to a wall through a round aperture.

BACKGROUND OF THE INVENTION

To improve the lighting or electrical services in their homes, homeowners frequently retrofit their homes with additional electrical devices or light fixtures. Typically this is done by locating an appropriate stud, removing the sheetrock, and installing a standard electrical box or frame member that is secured to the studs with fasteners. This method typically involves replacing or repairing a substantial amount of sheetrock around the newly installed electrical box.

An alternative method includes an electrical box or frame member with flip out arms. In this method, a hole is made in the sheetrock and the electrical box or frame member is pushed through the hole. The hole in the sheetrock must typically be made larger than the box or frame member in order to accommodate the flip out arms as they are passed through the wall. After passing through the sheetrock, the arms are rotated outwards from the box or frame member and fasteners tightened to draw the clamps and box tight against the sheetrock. One problem with this method is that the homeowner must make a hole large enough to accommodate the flip out clamps that extend outward from the sidewalls of the electrical box. Typically the electrician makes a hole with a knife or saw and then enlarges the hole around the perimeter to accommodate each of the clamps. Mounting a conventional box or conventional frame member with rotatable arms therefore typically takes anywhere from 10 to 12 minutes. Given the rates charged by qualified electricians, this excessive installation time can make the installation of additional electrical services very expensive.

What is needed is an inexpensive, mechanically simple electrical box or frame member that can be quickly installed on a wall with minimal effort. Installation of the box should require only a standard size hole-saw for preparing the wall for the box or frame member.

SUMMARY OF THE INVENTION

The invention is a two gang electrical box for securing one or two electrical components to a wall. The two gang electrical box includes a front plate having a front surface, a rear surface, an opening, and a rearward extending portion surrounding the opening and extending from the rear surface of the plate. The rearward extending portion terminates in a rear wall. Bosses with oversize holes are provided in the plate adjacent the opening for accommodating mounting fasteners. The mounting fasteners include heads accessible from the front of the plate and clamp arms secured rigidly to the ends of the fasteners. The peripheral wall is substantially round in profile and includes a diameter that is slightly less than the diameter of a standard size hole-saw. The clamp arms can be rotated to either an inward position or an outward position. The peripheral wall is provided with open areas or recesses to fully accommodate the clamp arms when rotated to the inward position thereby enabling the peripheral wall and clamp arms to pass easily within the wall opening created by the standard size hole-saw.

OBJECTS AND ADVANTAGES

Several advantages are achieved with the electrical mounting device of the present invention, including:

(1) The two gang electrical box or mounting device can be used to rapidly mount one or two electrical device or fixture on a wall.
(2) Wall preparation time is minimal as only a simple circular hole created by a standard size hole-saw is required in the drywall for mounting the electrical mounting device of the present invention to the wall.
(3) All the hardware for securing an electrical component to the wall is included with the electrical mounting device.
(4) The electrical mounting device can be easily installed on a wall with minimal prep work as the assembly is simply pressed into a circular hole that can easily be made with a standard-size hole-saw.
(5) The electrical mounting device includes openings or recesses to enable the clamp arms to retract completely within the profile of the rearward extending peripheral wall thereby enabling the clamp arms to fit within the circular opening created by the hole-saw.
(6) The electrical mounting device enables the mounting of one or two conventional electrical components, such as duplex receptacles or ground fault circuit interrupters (GRCI), with minimal wall preparation consisting of a simple circular hole in a wall.
(7) All portions of the rearward extending sidewall of the electrical mounting device are sized to fit easily through a circular hole created by a standard sized hole-saw.
(8) The electrical mounting device of the present invention significantly reduces the amount of time required for mounting an electrical device to a wall.

These and other objects and advantages of the present invention will be better understood by reading the following description along with reference to the drawings.

DESCRIPTION OF THE DRAWINGS

FIG. 15 is a front view of the box member.

FIG. 16 is a sectional view of the box member taken along line 16-16 of FIG. 15.

FIG. 17 is a sectional view of the box member taken along line 17-17 of FIG. 15.

Figure 1:
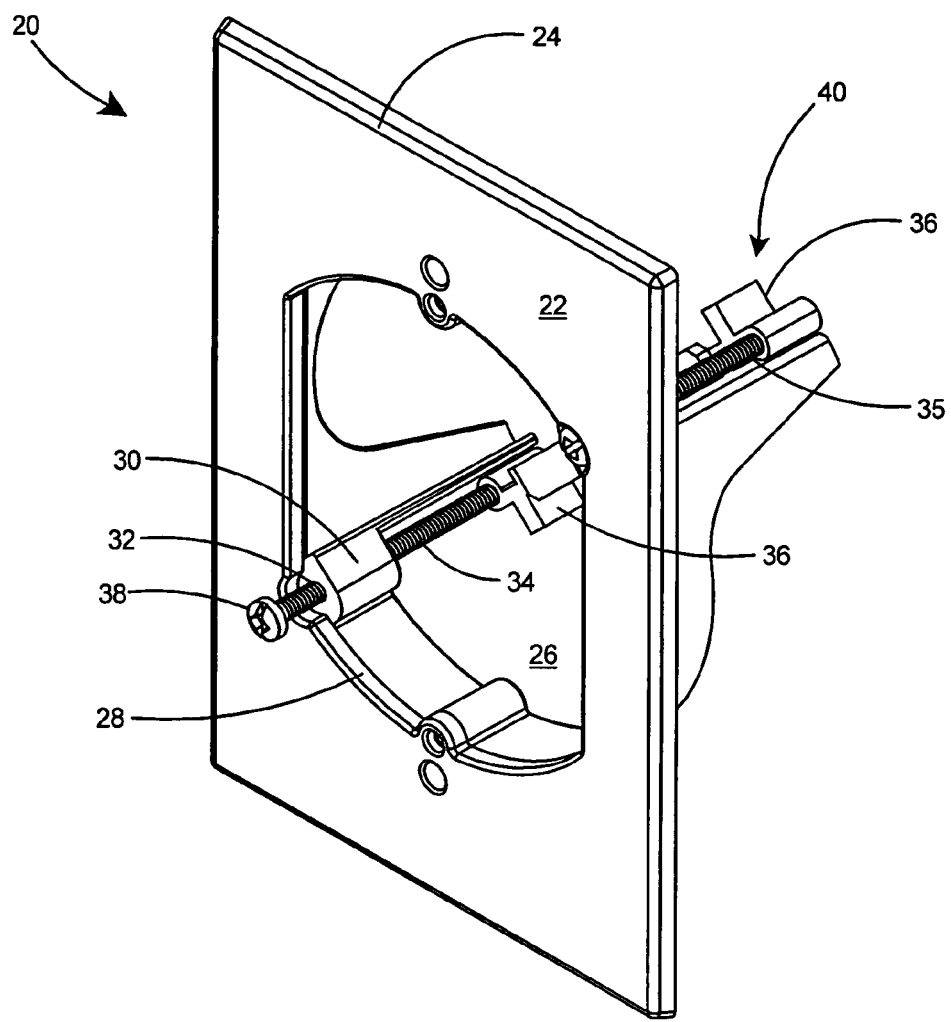
FIG. 1 is a front perspective view of a first embodiment of an electrical mounting device according to the present invention.

INDEX TO REFERENCE NUMERALS IN DRAWINGS 20 electrical mounting device, first embodiment
22 front plate
24 contoured periphery
26 opening
28 inner periphery
30 mounting boss
32 oversize aperture
34 mounting fastener
35 end of mounting fastener
36 clamp arm
38 fastener head
40 retracted position of clamp arm
42 component boss
44 aperture
46 rear surface of plate
48 sidewall
50 L-shaped post
52 frame member
54 extended position of clamp arm
55 base portion of clamp arm
56 stem portion of clamp arm
57 first edge
58 tab
59 bore through base portion of clamp arm
60 directional arrow
61 second edge
62 wall
64 hole in wall
66 sheetrock
67 low voltage electrical component
68 rear surface of sheetrock
69 fastener
70 electrical mounting device, second embodiment
72 rear wall
73 longitudinal axis
74 electrical box
75 lateral axis
76 inner enclosure
77 opposing ends of front opening
78 recessed area of sidewall
79 first portion of recessed area
80 corner of sidewall
81 second portion of recessed area
82 shallow recess of sidewall
84 circular portion of sidewall
86 knockout portion
88 channel 90 bore in component boss
92 diameter of hole in wall
94 second edge
96 electrical fitting
98 flat front portion of clamp arm
99 high voltage electrical component
100 faceplate
101 fastener
200 electrical mounting device, third and preferred embodiment
201 box member
202 plate
204 opening
206 sidewall
208A first pair of component connection bores
208B second pair of component connection bores
210 rear wall
212 inner cavity
214 outer periphery of sidewall
216 component boss
218 inner surface of sidewall
220 recessed surface
222 edge
224 rear surface of plate
225 circle depicting diameter of standard hole-saw
226 duplex receptacle
228 GFCI
230 fastener
232 fastener
234 cover plate
Θ1 total angle of rotation of the clamp arm in first embodiment
Θ2 total angle of rotation of the clamp arm in second embodiment
D1 outer diameter or outer periphery of circular peripheral wall
D2 second diameter or diameter at which first edge is located
D3 diameter of hole in wall created by hole-saw

DETAILED DESCRIPTION OF THE INVENTION

There are presented herein three embodiments of an electrical mounting device, each of which significantly reduces the amount of time required to install an electrical component or electrical fixture on a wall. A first embodiment of the electrical mounting device 20 (see FIG. 1), provides a mounting device for mounting a low voltage electrical component on a wall. A second embodiment of the electrical mounting device 70 (see FIG. 12), provides a mounting device for mounting a high voltage electrical component, such as a duplex receptacle or a switch, or an electrical fixture, such as a light fixture, on a wall. A third embodiment of the electrical mounting device 200 (see FIG. 28), provides a mounting device for mounting one or two electrical components, such as a duplex receptacle and a GFCI receptacle, on a wall. Conventional electrical mounting devices, such as the conventional LV1 single gang retro low voltage bracket, include wings that extend beyond the outer periphery of the LV1 frame. The wings cannot be retracted within the periphery of the frame. Thus, installation of the LV1 requires cutting a central hole, either rectangular or round in shape, in the drywall and then making additional cuts to accommodate the passage of the wings through the drywall. Mounting the LV1 on a wall therefore requires 10 to 12 minutes as a result of the time required to prepare a hole that will accommodate the non retractable wings. Conventional high voltage electrical boxes also include non retractable wings, therefore requiring a mounting time that is about the same as the LV1. By providing retractable clamp arms that are arranged to retract within the perimeter of a standard size hole-saw, the electrical mounting devices of the present invention can be mounted to a wall that is prepped with only a single cut by a hole saw, thereby reducing the mounting time to 20 to 30 seconds and offering significant time savings as compared to the installation of conventional LV1 type devices.

As shown in FIG. 1, the first embodiment of an electrical mounting device 20 according to the present invention includes a front plate 22 having a contoured periphery 24 and an opening 26 with an inner periphery 28. Two mounting bosses 30, integral with the plate 22, are provided along the inner periphery 28. The mounting bosses 30 include oversize apertures 32 therein. Substantially long mounting fasteners 34 include ends 35 that extend through the oversize apertures 32 in the mounting bosses 30 and each mounting fastener 34 includes a clamp arm 36 secured rigidly to the end 35 of the fastener 34. Thus each mounting fastener 34 can be easily rotated within its oversize aperture 32 as desired by turning the head 38 of the respective fastener 34 with an appropriate tool such as a screwdriver (not shown). Each clamp arm 36 can therefore be rotated between an extended position and retracted position 40 as desired. FIG. 1 depicts the clamp arms 36 in the retracted position 40.

Figure 2:
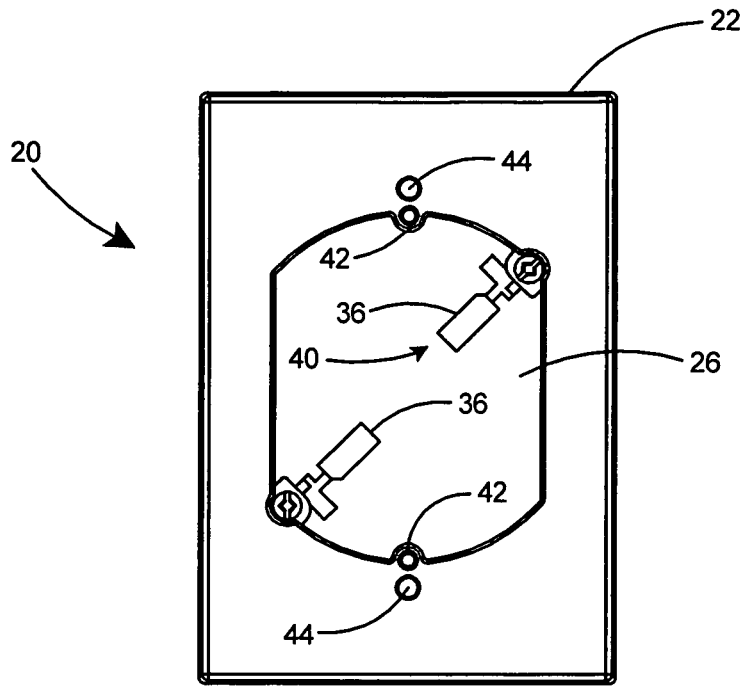
FIG. 2 is a front view of the electrical mounting device or frame of FIG. 1, with the clamp arms rotated to a retracted position.
Figure 3:
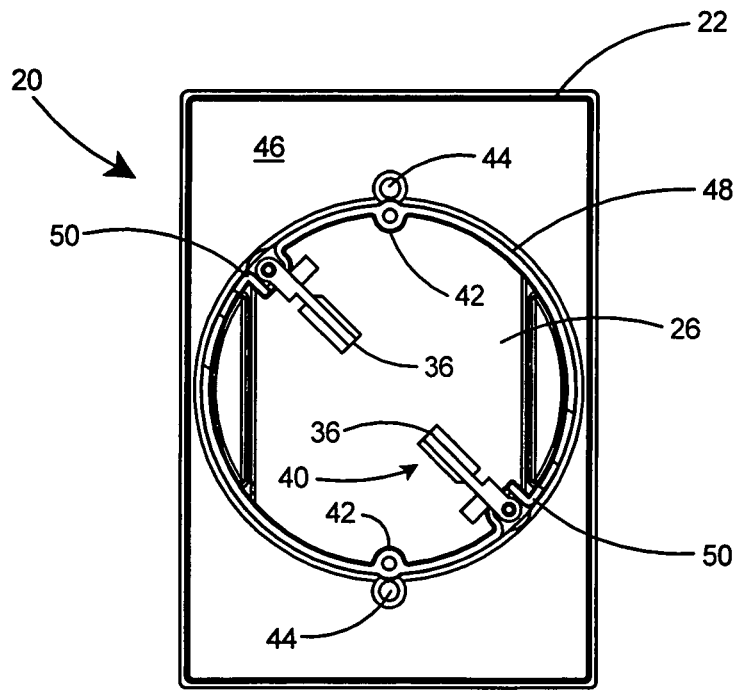
FIG. 3 is a rear view of the electrical mounting device of FIG. 1.

With reference to FIGS. 2 and 3, which depict the clamp arms 36 in the retracted position 40, the electrical mounting device 20 further includes component bosses 42 along the inner periphery 28 of the opening 26 and apertures 44 for the connection of electrical fixtures (not shown). As shown in FIG. 3, the rear surface 46 of the plate 22 includes a sidewall 48. Two L-shaped posts 50 extend rearward from the sidewall 48 immediately adjacent to each mounting boss 30. As shown in FIG. 3, with the clamp arms 36 rotated to their retracted position 40, the clamp arms 36 are confined completely within the perimeter of the sidewall 48.

Figure 4:
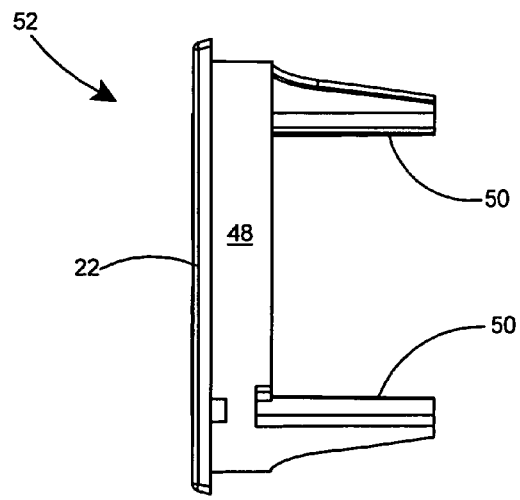
FIG. 4 is a front view of the electrical mounting device or frame of FIG. 1, with the clamp arms rotated to an extended position.
Figure 5A:
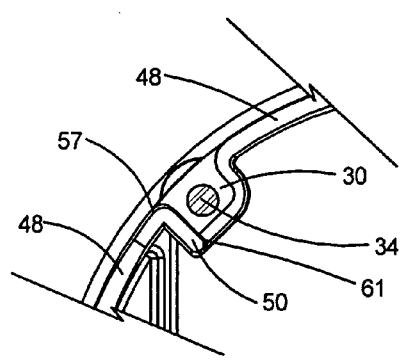
FIG. 5A is a detail of a portion of the circular peripheral wall and L-shaped post on the rear side of the electrical mounting device of FIG. 5.
Figure 5:
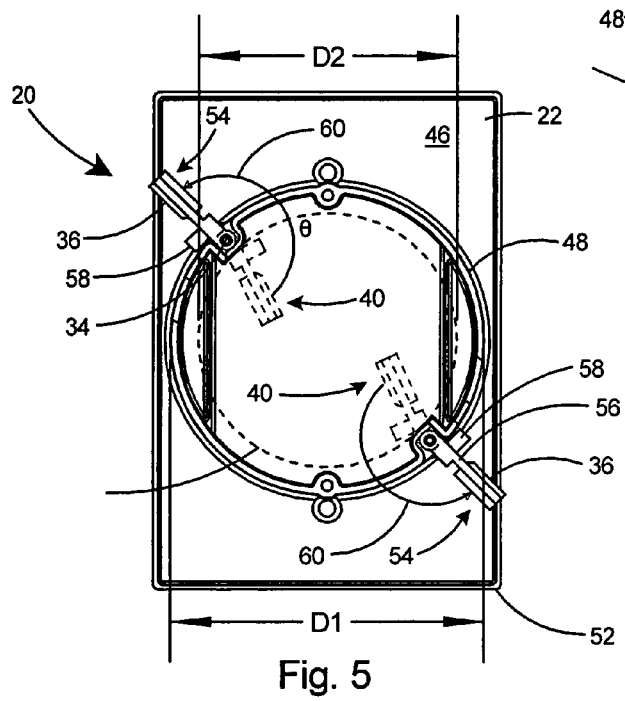
FIG. 5 is a sectional view of the electrical mounting device taken along line 5-5 of FIG. 4.

Referring to FIGS. 4-5A, two L-shaped posts 50 extend from the sidewall 48. As shown in FIG. 4, the front plate 22, sidewall 48, and posts 50 together form a low voltage frame member 52. The frame member 52 is typically molded in one-piece of plastic. As shown in FIG. 5, the clamp arms 36 can be rotated from the retracted position 40 to an extended position 54, or vice versa, by turning mounting fastener 34. Each clamp arm 36 includes a base portion 55, a stem portion 56 and an outward extending tab 58. Base portion 55 of clamp arm 36 includes a bore 59 therein through which the mounting fastener will extend. As the clamp arm is rotated fully in the direction of arrow 60 in FIG. 5, the tab 58 engages the L-shaped post 50 and stops the travel of the clamp arm 36 thereby positioning the clamp arm 36 in the extended position 54. If the clamp arm 36 is rotated fully in the direction opposite of arrow 60, the stem 56 of the clamp arm 36 engages a first edge 57 on L-shaped post 50 thereby positioning the clamp arm 36 in the retracted position 40. Circular sidewall 48 of electrical mounting device 20 includes an outer periphery or outer diameter D1. As shown in FIG. 5, the first edge 57 is at a second diameter D2, which is a smaller diameter than the outer periphery D1 of the sidewall 48, and first edge 57 positions the clamp arms 36 in the retracted position 40 thereby retracting all portions of the clamp arms 36 within the outer periphery D1 of the sidewall 48. The total angle of rotation Θ1 of the clamp arm 36 from the retracted position 40 to the extended position 54 is 198°. The two clamp arms 36 are situated at 180° apart on opposite sides of the sidewall 48. As viewed from the front side of the front plate 22, rotation of the clamp arms 36 fully counterclockwise will position the clamp arms 36 in the retracted position 40 and rotation of the clamp arms 36 fully clockwise will position the clamp arms 36 in the extended position 54. As shown in FIG. 5A, the L-shaped post 50 is located along the sidewall 48 immediately adjacent to the mounting boss 30 through which the mounting fastener 34 extends. A second edge 61 is provided on each L-shaped post 50 to stop the rotation of the clamp arm 36 when it is fully turned clockwise to the extended position 54 and thus properly position the clamp arm 36 behind the sheetrock.

Figure 6:
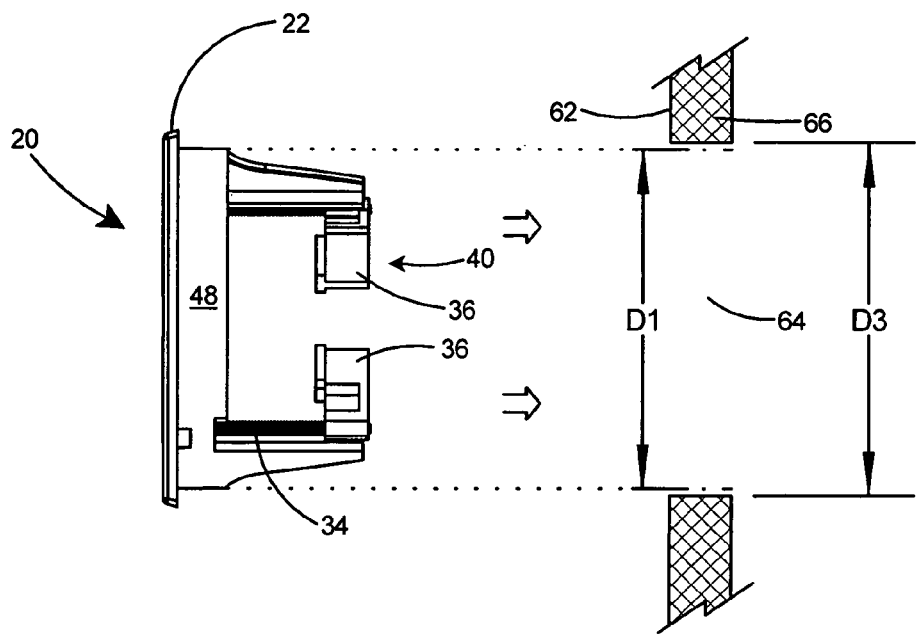
FIG. 6 is a side view of the first embodiment of the electrical mounting device in alignment with a hole in a wall and with the clamp arms retracted.
Figure 7:
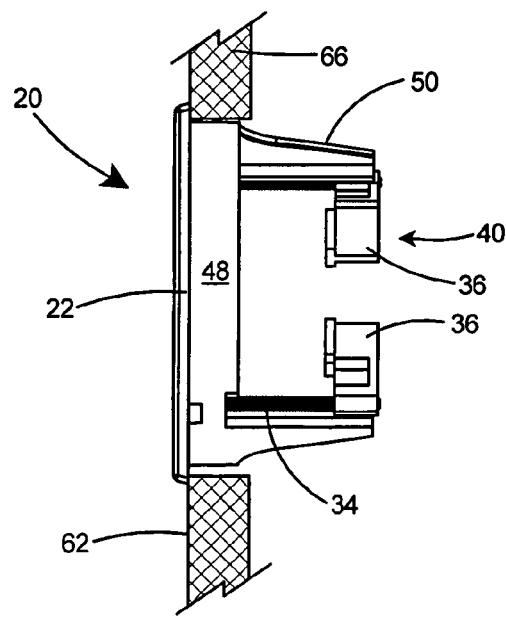
FIG. 7 is a side view of the electrical mounting device of FIG. 6 after it has been inserted into the wall.
Figure 8:
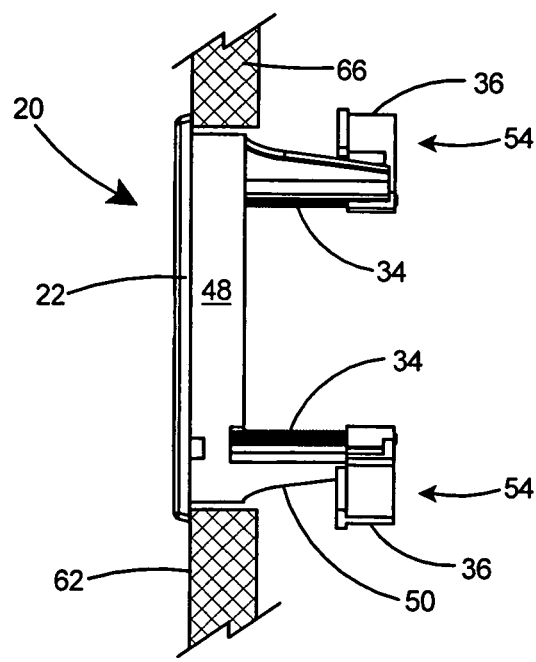
FIG. 8 is a side view of the electrical mounting device of FIG. 7 after the clamp arms have been rotated to the extended position.
Figure 9:
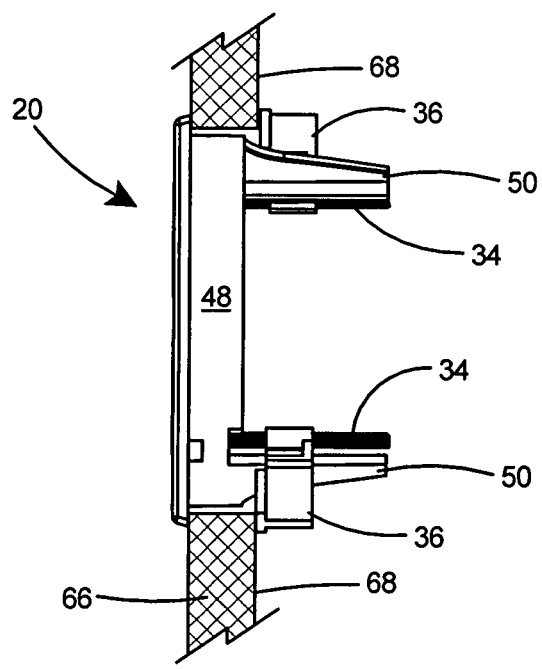
FIG. 9 is a side view of the electrical mounting device of FIG. 8 after the clamp arms have been tightened to secure the frame to the wall.

Referring to FIGS. 6-9, there are shown a sequence of figures that illustrate the operation of the first embodiment of the electrical mounting device 20 of the present invention. For securing the electrical mounting device 20 to a wall 62, an installer simply makes a hole 64 in the sheetrock 66 using a standard hole-saw (not shown) of the proper size. As an example, for an electrical mounting device 20 with a sidewall 48 having an outer periphery or outer diameter D1 of 3.49 inch, a standard 3.5 inch hole-saw is used to create a hole 64 of diameter D3 in the sheetrock 66. To install the electrical mounting device 20, the clamp arms 36 are first rotated to the retracted position 40 as shown in FIG. 6. The mounting device 20 is then inserted into hole 64 until the front plate 22 contacts and is flush against the wall 62 as shown in FIG. 7. The clamp arms 36 are then rotated to the extended position 54, as shown in FIG. 8, by turning the mounting fasteners 34 clockwise. Continued rotation of the mounting fasteners 34 in the clockwise direction will draw clamp arms 36 against the rear surface 68 of the sheetrock 66 as shown in FIG. 9, thereby securing the electrical mounting device 20 to the wall 62. The entire sequence of drilling the hole 64 and installing the electrical mounting device 20 of the present invention requires only 20 to 30 seconds thereby offering significant time savings as compared to the installation of conventional LV1 type devices which typically take 10 to 12 minutes to install as a result of the extensive wall preparation that is required.

Figure 10:
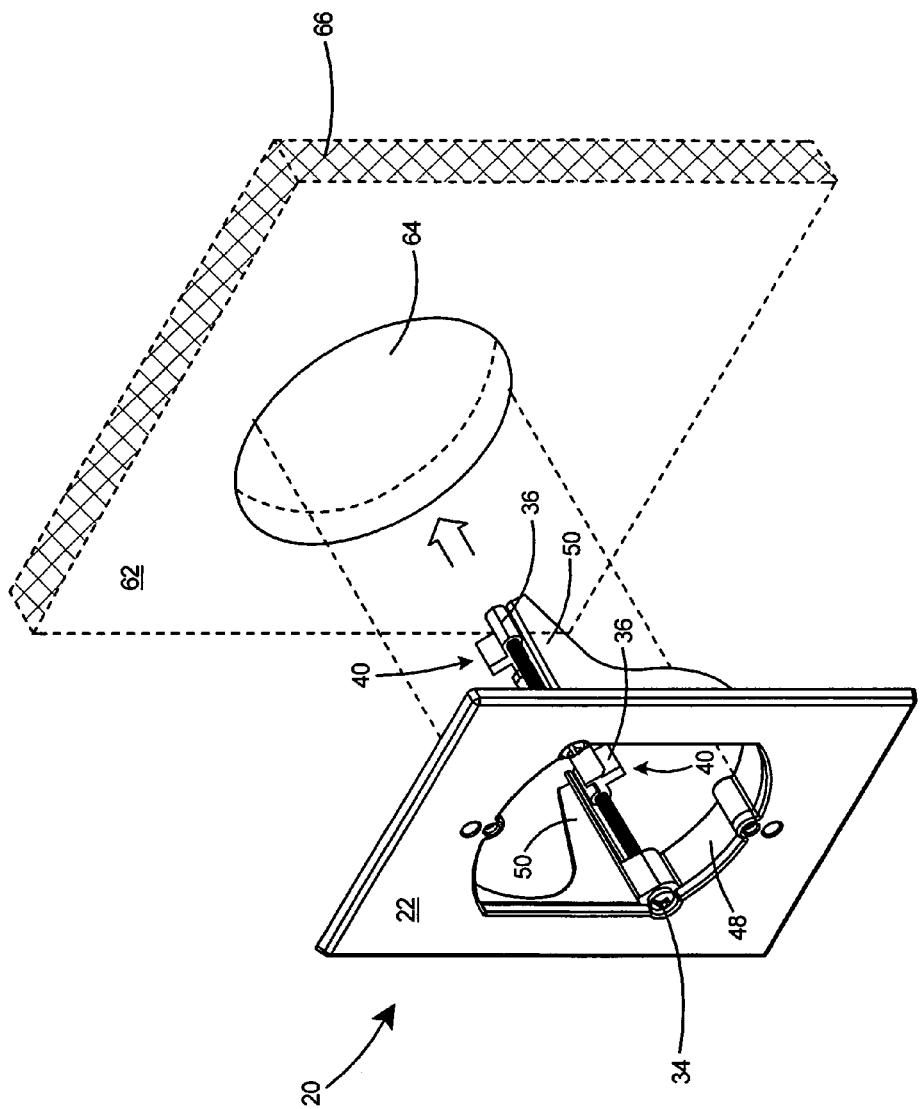
FIG. 10 is a perspective view of the first embodiment of the electrical mounting device in alignment to be inserted into a hole in a wall.
Figure 11:
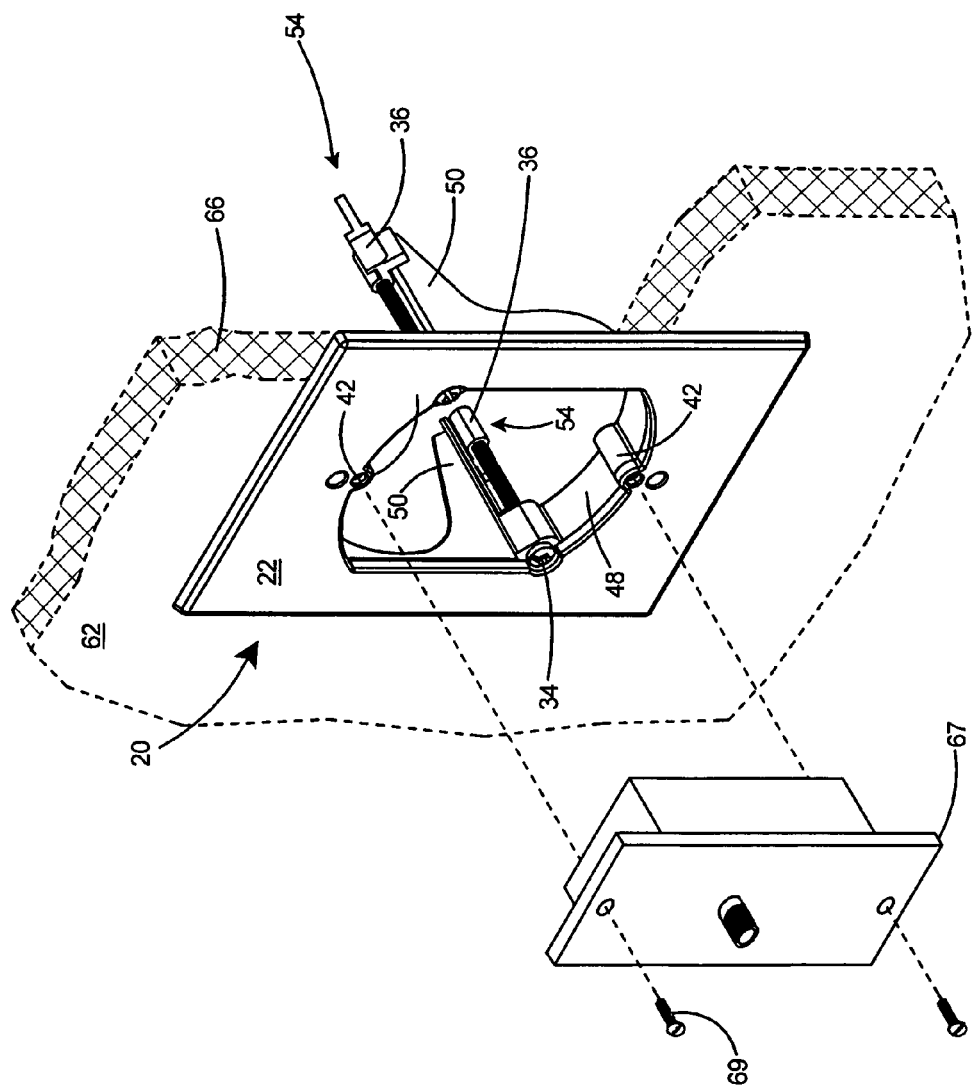
FIG. 11 is a perspective view of the electrical mounting device of FIG. 10 and a portion of the surrounding wall after the mounting device is secured to the wall and with an electrical component in alignment to be secured to the mounting device.

FIGS. 10 and 11 also depict the operation of the first embodiment of the electrical mounting device 20. FIG. 10 depicts the electrical mounting device 20 in alignment with a circular hole 64 created by a hole-saw (not shown) of the appropriate size. The clamp arms 36 are rotated fully counterclockwise to the retracted position 40 which places them inside the periphery of the sidewall 48. FIG. 11 depicts the electrical mounting device 20 after it has been placed flush against a wall 62 and with the clamp arms 36 rotated clockwise to the extended position which locates the clamp arms 36 outward of the sidewall 48 and behind the wall 62. A portion of the wall 62 has been cut away to show details of the electrical mounting device. A low voltage electrical component 67 is in alignment with the opening 26 in the plate 22 of the electrical mounting device 20 to be secured thereto by fasteners 69 secured into the component bosses 42.

Figure 12:
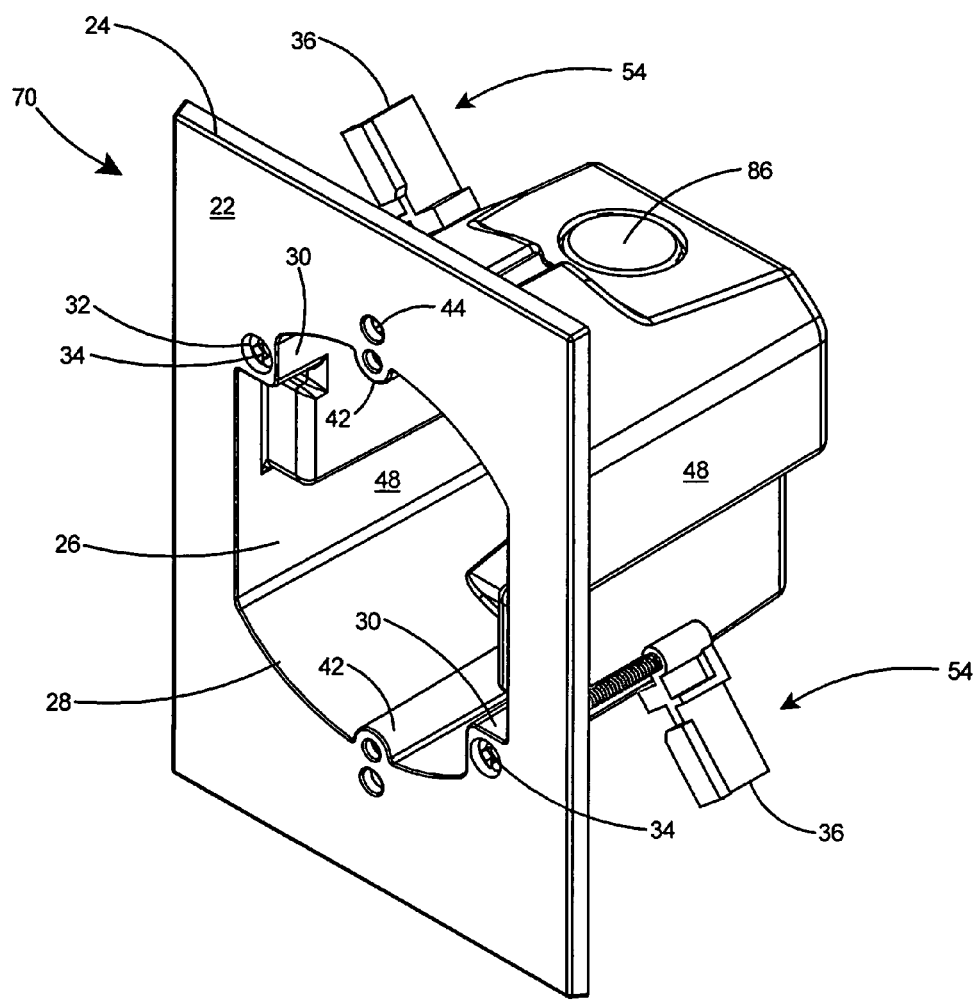
FIG. 12 is a front perspective view of a second embodiment of an electrical mounting device according to the present invention with the clamp arms extended.

With reference to FIG. 12, there is shown a second embodiment of an electrical mounting device 70 according to the present invention. The second embodiment of the electrical mounting device 70 includes many of the same elements as the first embodiment, including a front plate 22 with contoured periphery 24, opening 26 with an inner periphery 28, and two mounting bosses 30 along the inner periphery 28 that are integral with the plate 22. Substantially long mounting fasteners 34 extend through oversize apertures 32 in the mounting bosses 30 and each mounting fastener 34 includes a clamp arm 36 secured rigidly to the end of the fastener 34. Thus each mounting fastener 34 can be easily rotated within its oversize aperture 32 as desired by turning the head 38 of the respective fastener 34 with an appropriate tool such as a screwdriver (not shown). Each clamp arm 36 can therefore be rotated between an extended position and retracted position as desired. FIG. 12 depicts the clamp arms 36 in the extended position 54.

Figure 13:
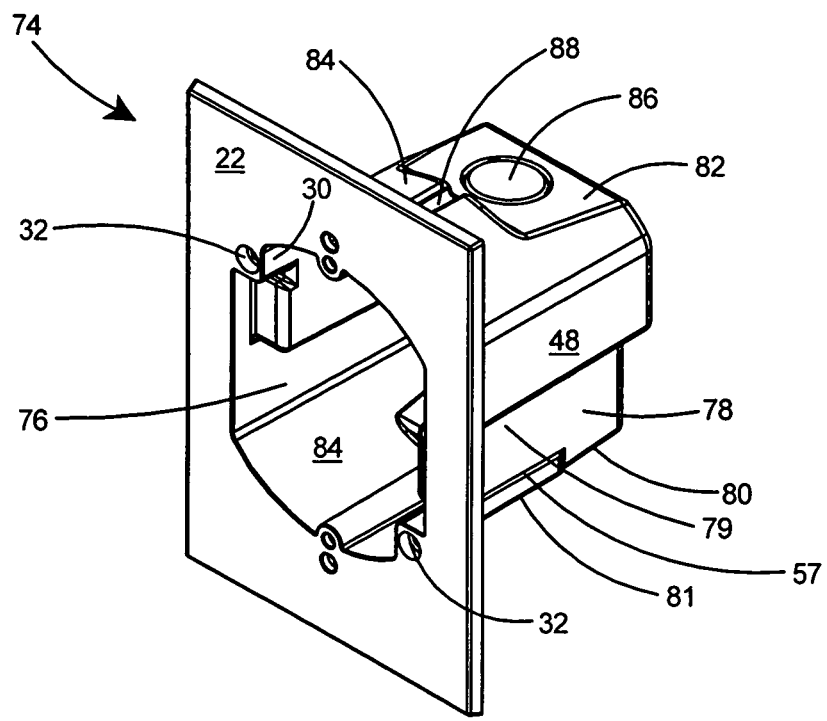
FIG. 13 is a front perspective view a box member that forms a portion of the electrical mounting device of FIG. 12.
Figure 14:
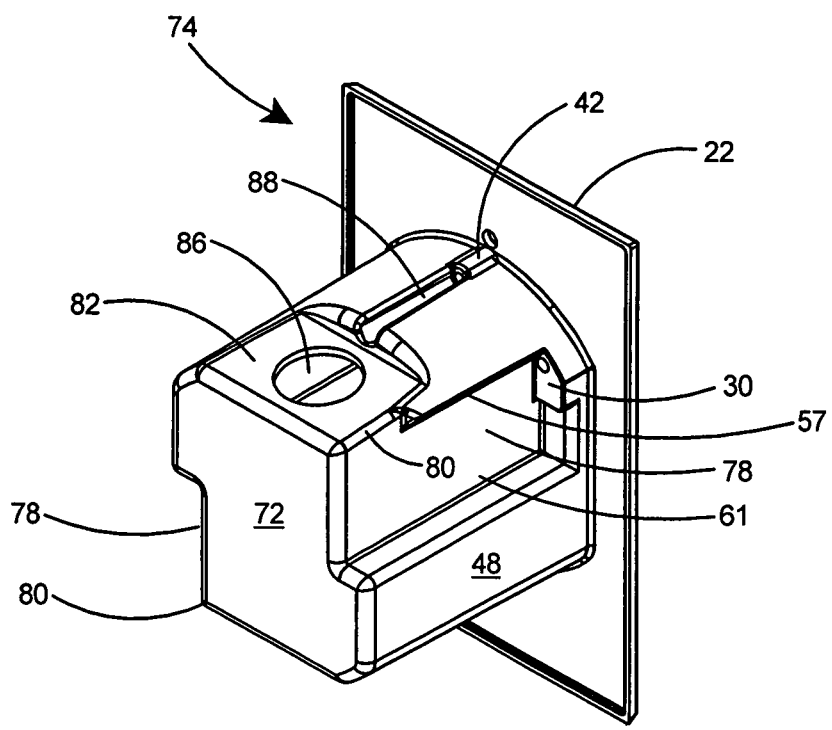
FIG. 14 is a rear perspective view of the box member of FIG. 13.

Referring to FIGS. 13 and 14, the front plate 22 and sidewall 48 are closed by a rear wall 72 to form an electrical box 74 with an inner enclosure 76. The electrical box 74 portion of the second embodiment of the electrical mounting device may be constructed of metal or plastic but is most preferably molded in one piece of plastic. As for the first embodiment, the sidewall 48 of the second embodiment of the electrical mounting device is substantially circular in shape and all portions of the sidewall 48 are sized to fit within the inner periphery of a standard size hole-saw (not shown). The sidewall 48 includes recessed areas 78 on opposing corners 80 of the sidewall 48. The first edge 57 for stopping the counterclockwise rotation of clamp arm 36 is on a first portion 79 of recessed area 78 and the second edge 61 for stopping the clockwise rotation of clamp arm 36 is on a second portion 81 of recessed area 78. Shallow recessed areas 82 on the circular portion 84 of the sidewall 48 include knockout portions 86. The circular portion 84 of the sidewall 48 includes a channel 88 extending rearward from each of the component bosses 42. All portions of the sidewall 48 including the circular sidewall portion 84 sized to fit within the inner periphery of a standard size hole-saw.

With reference to FIGS. 15-17, the component bosses 42 include bores 90 therein for acceptance of screws (not shown) for connecting high voltage components such as duplex receptacles, switches or the like. As shown in FIG. 15, the entire sidewall 48 of the electrical box 74 is dimensioned and shaped to fit within the diameter 92 of the hole created by the standard size hole-saw that it is used in conjunction with. As shown in FIGS. 16 and 17, the sidewall 48 and rear wall 72 define a spacious inner enclosure 76 for accepting an electrical component therein. As shown in FIG. 15, the plate 22 includes a longitudinal axis 73 and a lateral axis 75 and the component bosses 42 are preferably located at opposing ends 77 of the plate opening 26 along the longitudinal axis 73.

Figure 18:
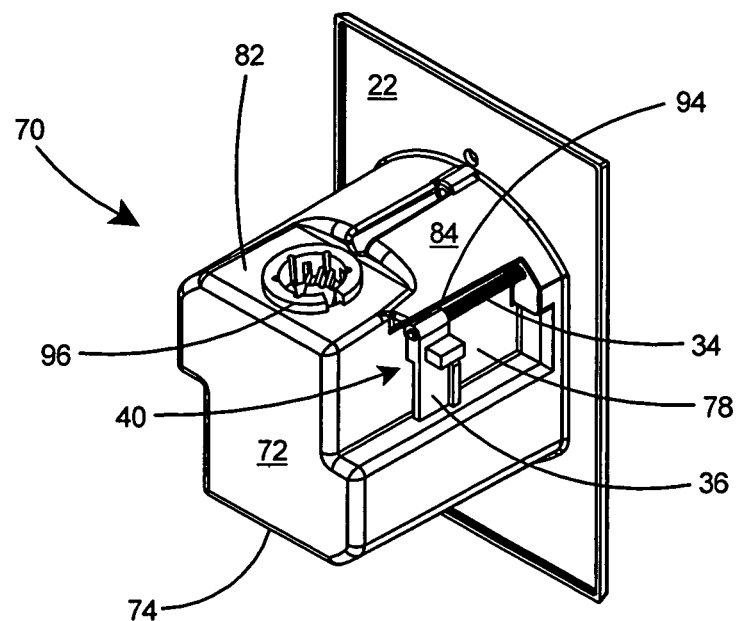
FIG. 18 is a rear perspective view of the second embodiment of the electrical mounting device with the clamp arms in the retracted position.
Figure 19:
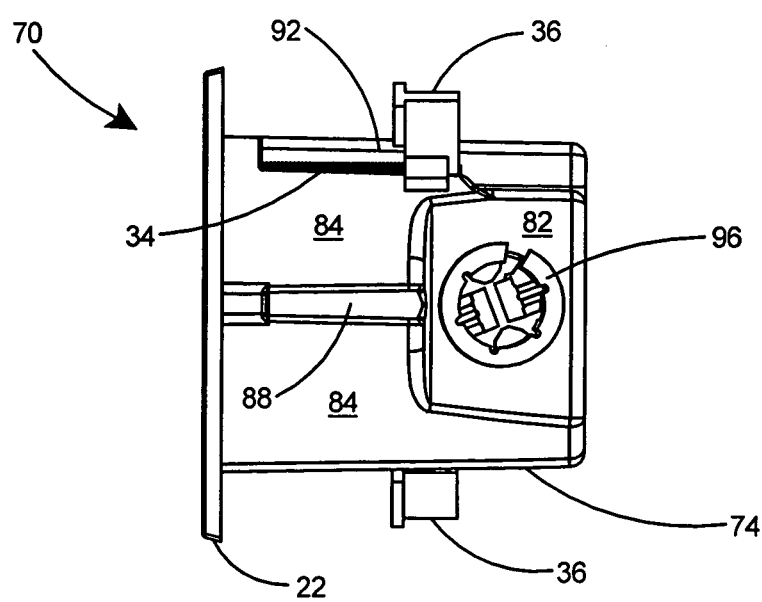
FIG. 19 is a top view of the second embodiment of the electrical mounting device with the clamp arms in the extended position.

Referring to FIGS. 18 and 19, when in the retracted position 40, the clamp arms 36 are recessed within the recessed area 78 of the sidewall 48. The second embodiment of the electrical mounting device 70 includes a second edge 94 which will serve to stop the clockwise advancement of the mounting fastener 34 and position the clamp arm 36 in the extended position (not shown). The shallow recess 82 in the sidewall 48 of the electrical box 74 can include an electrical fitting 96 therein that has been inserted in a knockout aperture 86. An electrical fitting 96 such as the "BLACK BUTTON™" connector available from Arlington Industries, Inc., of Scranton, Pa., can be inserted within the aperture, frictionally held therein as shown. The "BLACK BUTTON™" connector is disclosed in U.S. Pat. No. 5,693,910, the entire contents of which are incorporated herein by reference.

Figure 20:
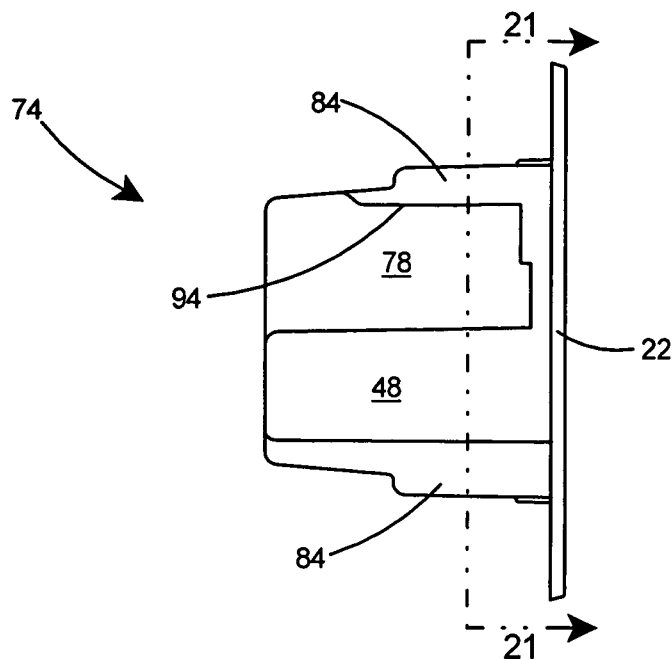
FIG. 20 is a side view of the electrical box of FIG. 13.
Figure 21:
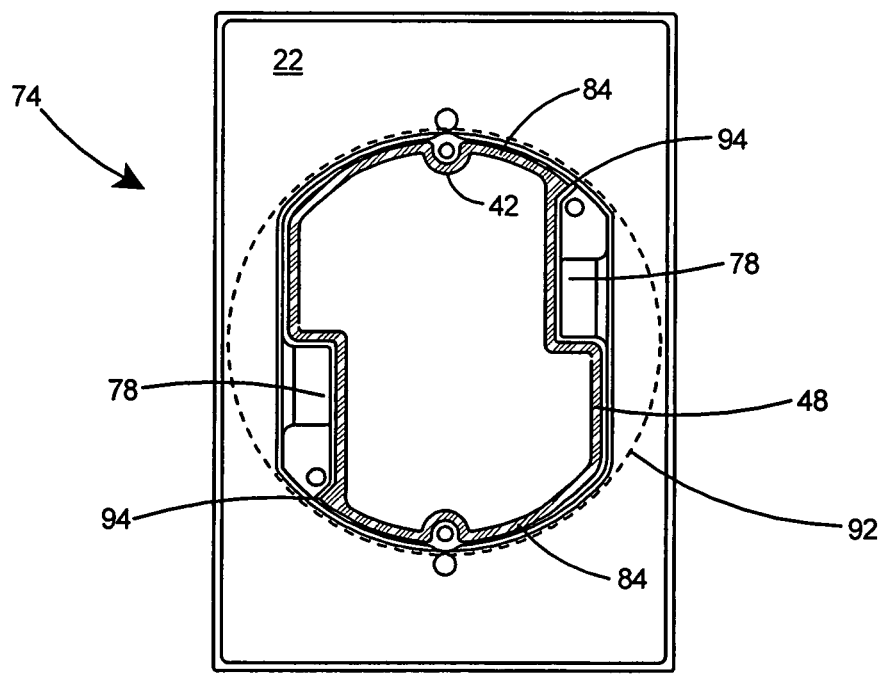
FIG. 21 is a sectional view of the electrical box taken along line 21-21 of FIG. 20.

With reference to FIGS. 20 and 21, the sidewall 48 of the electrical box 74 including circular wall portion 84 and recessed areas 78 are confined within the diameter of a hole formed by a standard size hole-saw (not shown), as denoted by dashed line 92 in FIG. 21. As shown in FIG. 21, the second edge 94 is an integral extension from the recessed area 78 of the sidewall 48.

Figure 22:
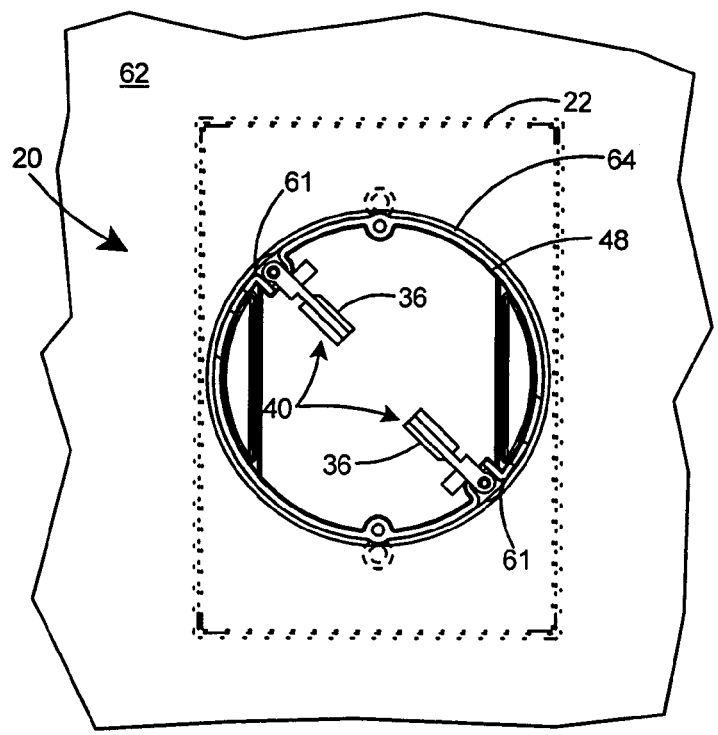
FIG. 22 is a rear view of a wall portion and the first embodiment of the electrical mounting device after the retracted clamp arms and rearward extending peripheral wall have been inserted through the hole in the wall.
Figure 23:
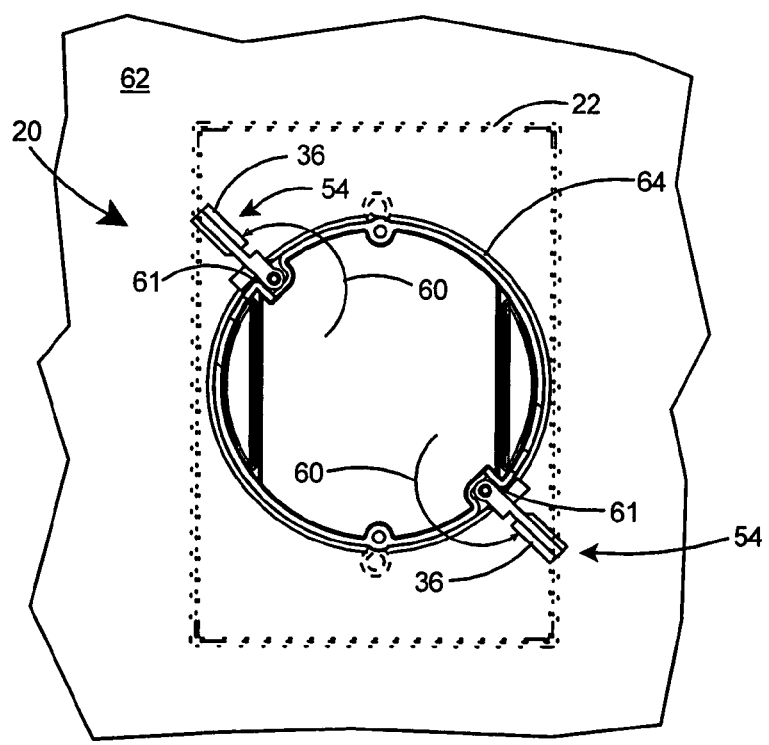
FIG. 23 is a rear view of the wall portion of FIG. 20 and the first embodiment of the electrical mounting device with the clamp arms extended.

FIGS. 22 and 23 depict the first embodiment of the electrical mounting device 20 mounted in a hole 64 in the wall 62. For inserting the electrical mounting device 20 through the hole 64 in the wall 62, clamp arms 36 are rotated to the retracted position 40, as shown in FIG. 22. Thus all portions of the electrical mounting device 20 extending rearward from the front plate 22 can slip easily through the wall opening 64 created by the hole-saw. After being inserted through the opening 64, the clamp arms 36 are rotated clockwise (as viewed from the front of the mounting device) (see directional arrow 60) until contacting second edge 61, which positions the clamp arms 36 in the extended position 54 as shown in FIG. 23. The clamp arms 36 in the extended position 54 are thus ready to be tightened against wall 62 to secure the electrical mounting device 20 to the wall.

Figure 24:
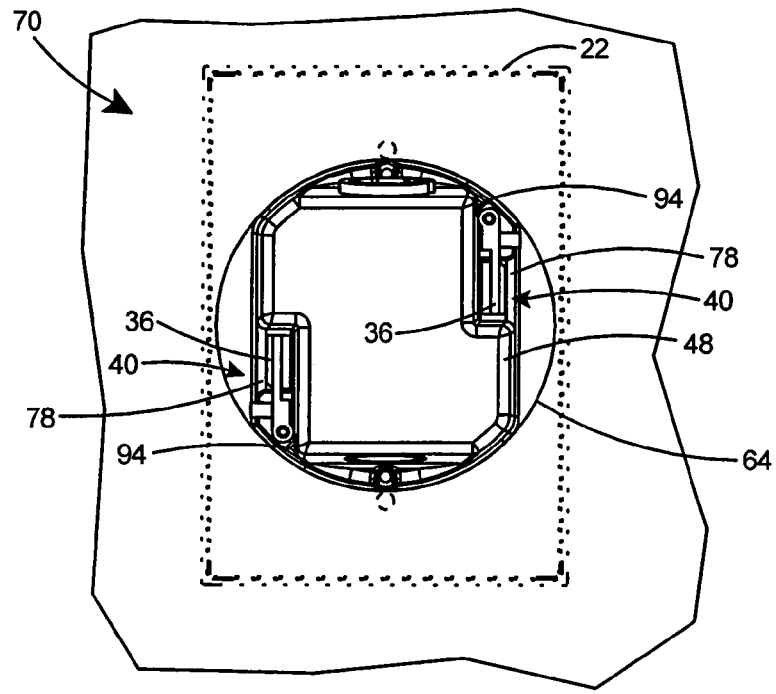
FIG. 24 is a rear view of a wall portion and the second embodiment of the electrical mounting device after the retracted clamp arms and rearward extending peripheral wall have been inserted through the hole in the wall.
Figure 25:
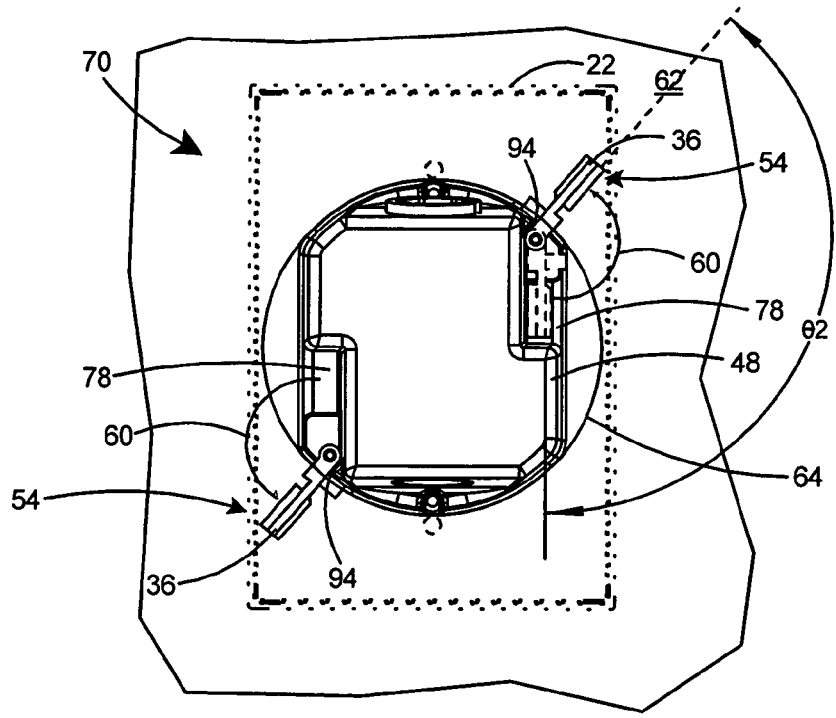
FIG. 25 is a rear view of the wall portion of FIG. 22 and the second embodiment of the electrical mounting device with the clamp arms extended.

FIGS. 24 and 25 depict the second embodiment of the electrical mounting device 70 mounted in a hole 64 in the wall 62. For inserting the electrical mounting device 20 through the hole 64 in the wall 62, clamp arms 36 are rotated to the retracted position 40, as shown in FIG. 24. All portions of the electrical mounting device 70 extending rearward from the front plate 22 can slip easily through the wall opening 64 created by the hole-saw. After being inserted through the opening 64, the clamp arms 36 are rotated clockwise through angle $\Theta 2$ (as viewed from the front of the mounting device) (see directional arrow 60) until contacting second edge 94, which positions the clamp arms 36 in the extended position 54 as shown in FIG. 25. The clamp arms 36 in the extended position 54 are thus ready to be tightened against wall 62 to secure the electrical mounting device 70 to the wall. The total angle $\Theta 2$ of rotation of the clamp arm 36 for the second embodiment of the electrical mounting device 70 is most preferably 140°. Preferably, for both embodiments of the present invention, the total angle of rotation of the clamp arms 36 between the retracted and extended positions is between 130 and 210 degrees.

Figure 26:
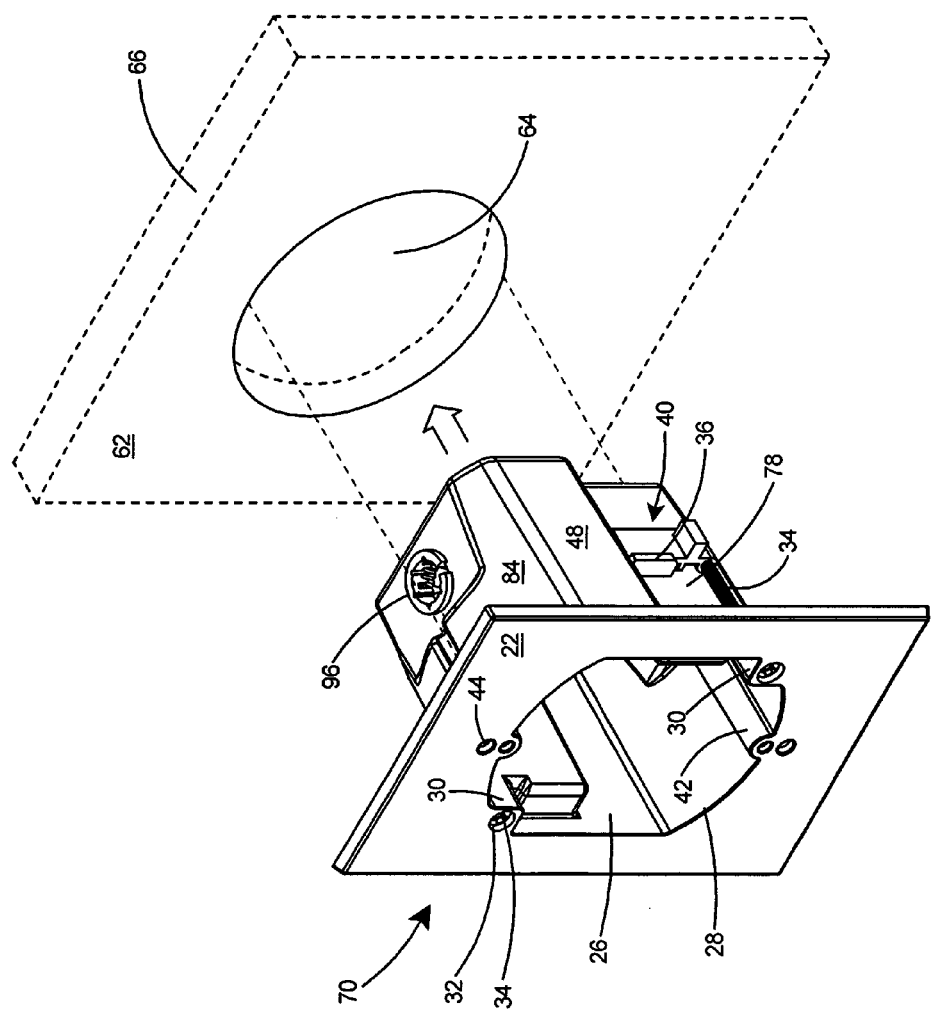
FIG. 26 is a perspective view of the second embodiment of the electrical mounting device in alignment with a hole in a wall and with the clamp arms retracted.

With reference to FIG. 26, in order to prepare the electrical mounting device 70 for insertion through the hole 64, the clamp arms 36 are each rotated counterclockwise to the retracted position 40 thereby positioning all portions of the clamp arm 36 within a circle extending through the circular portion 84 of the sidewall 48. Each clamp arm 36 includes a flat front portion 98 facing the rear surface of the plate 22.

Figure 27:
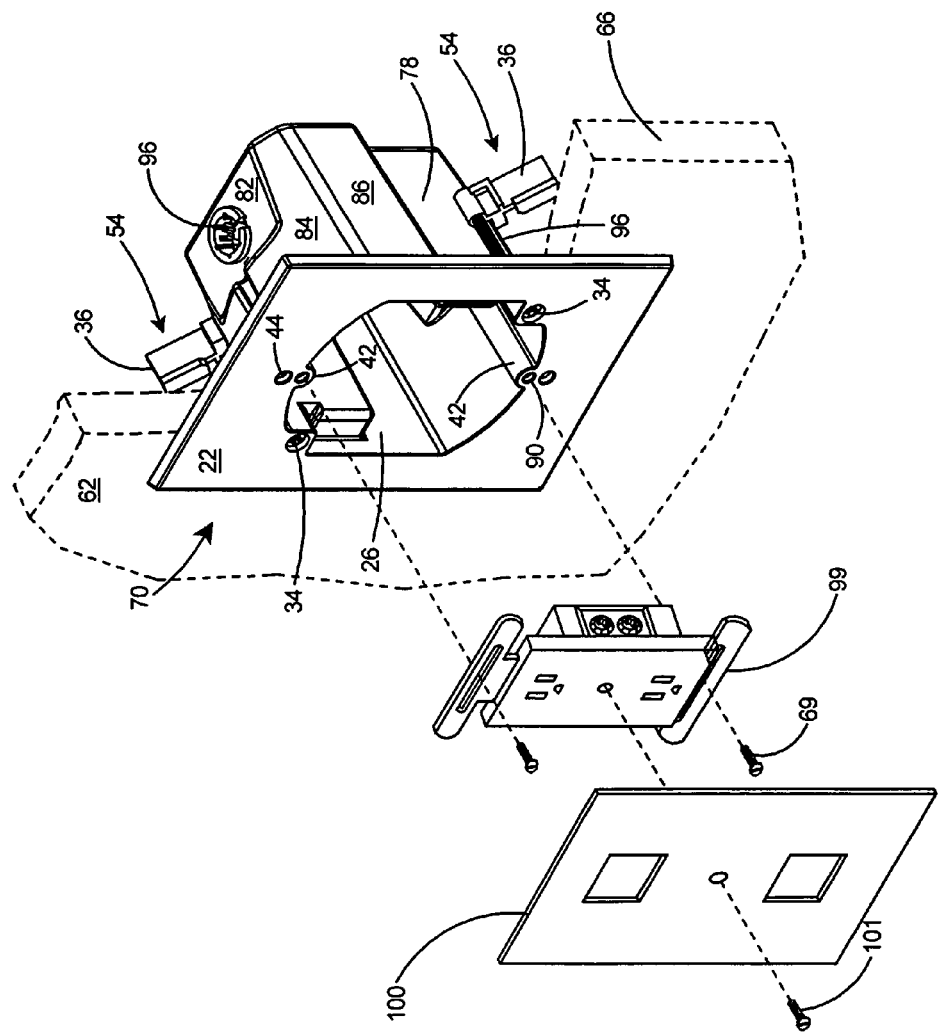
FIG. 27 is a perspective view of the electrical mounting device of FIG. 24 and a portion of the surrounding wall after the mounting device is secured to the wall and with an electrical component in alignment to be secured to the mounting device.

With reference to FIG. 27, after being inserted through the circular hole created by the hole-saw, the mounting fasteners 34 are rotated fully clockwise until clamp arms 36 are in their extended positions 54 and rotation is continued until the flat front portions 98 of clamp arms 36 are drawn tightly against the sheetrock 66 thereby securing the electrical mounting device 70 tightly against the wall 62. A portion of the wall 62 has been cut away to show details of the electrical mounting device. A high voltage electrical component 99 is in alignment with the opening 26 in the plate 22 of the electrical mounting device 70 to be secured thereto by fasteners 69 secured into the component bosses 42. A conventional faceplate 100 is then secured to the installed electrical component 99 by fastener 101.

The electrical box 74 portion of the second embodiment of the electrical mounting device 70 of the present invention may be constructed of metal or plastic but is most preferably molded in one piece of plastic. The electrical box 74 can be molded of any suitable plastic including polycarbonate, polyvinylchloride, acrylonitrile butadienestyrene, or a polyolefin.

Figure 28:
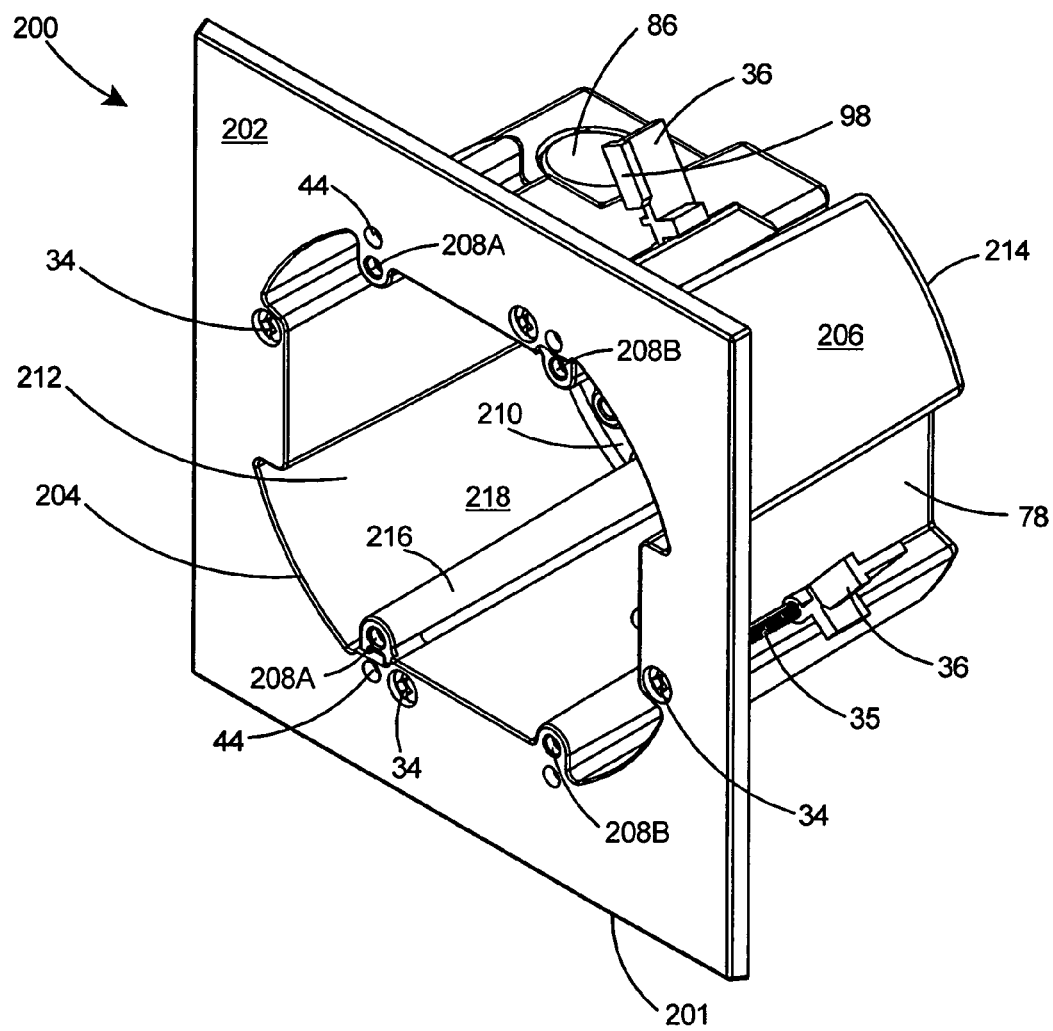
FIG. 28 is a front perspective view of a third and preferred embodiment of a two gang electrical box according to the present invention.

As shown in FIG. 28, a third and preferred embodiment of the electrical mounting device of the present invention is a rapid mount two gang electrical box 200 that, similar to the first and second embodiments, also requires only minimal wall preparation prior to mounting it to the wall. The two gang electrical box 200 includes a box member 201 with a plate 202 having an opening 204 therein, a sidewall 206 extending rearward from the plate 202 at the periphery of the opening 204, and two pairs of component connection bores 208A and 208B for mounting up to two electrical components to the box. Apertures 44 are provided outside of the component connection bores 208A, 208B to later accommodate fasteners (not shown) from a GFCI or similar electrical component, if such component is mounted therein. The two gang electrical box 200 enables the installation of up to two electrical components, such as duplex receptacles, GFCI receptacles, switches, and many additional electrical components, to a wall, ceiling, or similar structure. Minimal wall preparation is required for preparing the wall for installation of the two gang electrical box 200, thereby enabling an installer to mount a plurality of electrical components more rapidly than possible with conventional electrical boxes. The sidewall 206 is closed by a rear wall 210 thereby forming an inner cavity 212 for housing of electrical components (not shown). The outer periphery 214 of the sidewall 206 is of substantially circular shape. A plurality of mounting fasteners 34 include ends 35 extending through the plate 202 and a clamp arm 36 rigidly secured to the end 35 of each mounting fastener 34.

Figure 29:
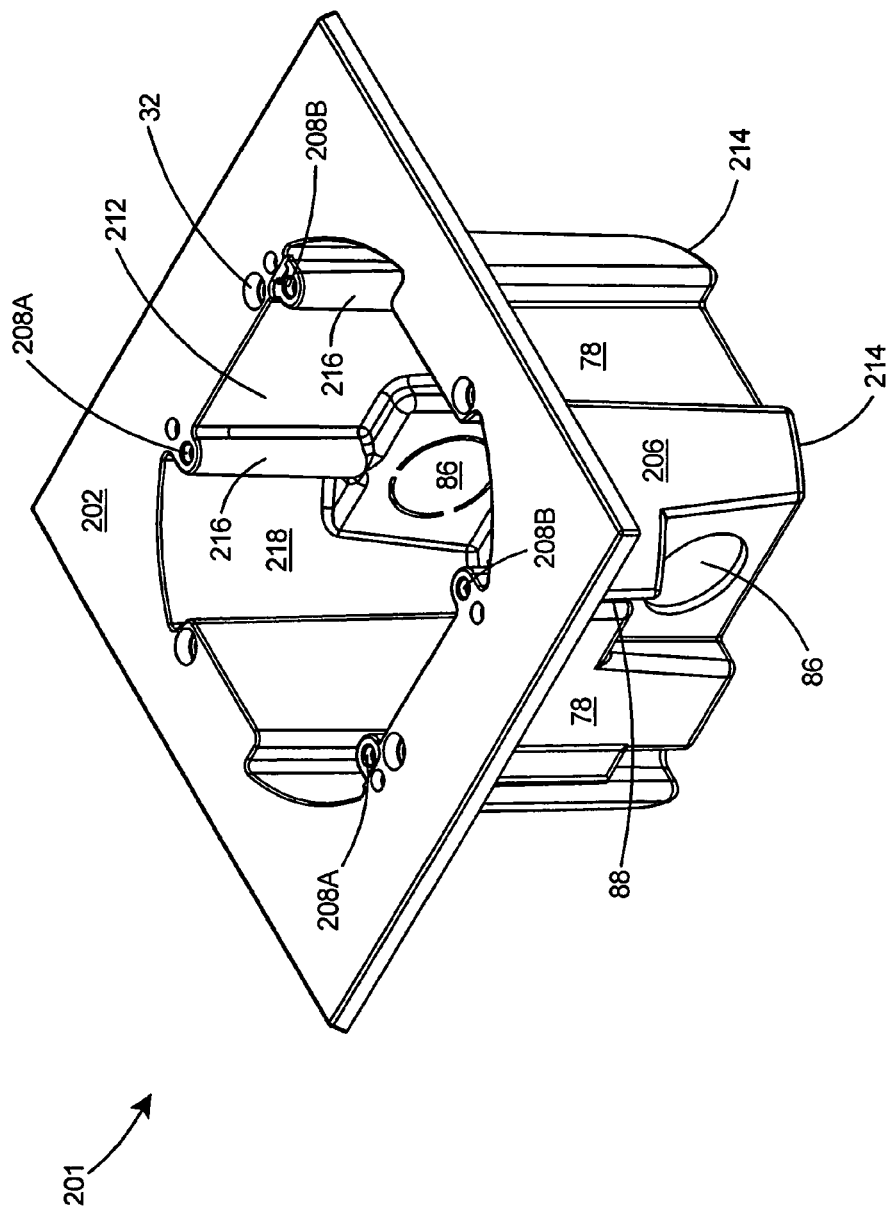
FIG. 29 is a front perspective view a box member that forms a portion of the electrical mounting device of FIG. 28.

Referring to FIG. 29, the sidewall 206 of the two gang electrical box 200 includes recessed areas 78 therein. A plurality of knockout sections 86 that are provided in the sidewall 206 can be removed from the sidewall 206 in order to form openings for the passage of electrical wiring into the inner cavity 212 of the duplex box. The sidewall 206 includes an inner surface 218 and the component connection bores 208A and 208B reside in component bosses 216 that extend along the inner surface 218 of the sidewall 206. The sidewall 206 further includes a channel 88 extending rearward from each of the component bosses 208A and 208B.

Figures 30, 31:
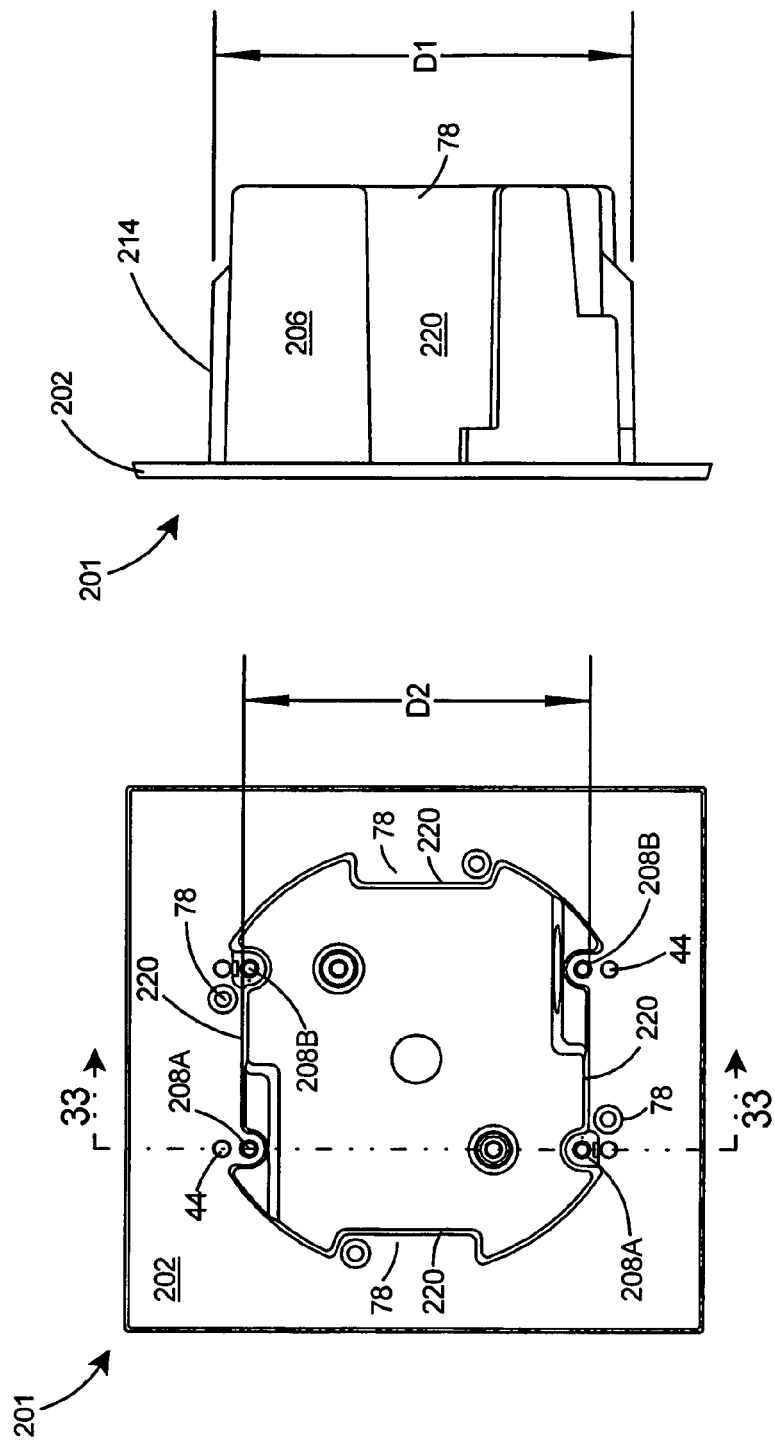
FIG. 30 is a front view of the box member.
FIG. 31 is a side view of the box member as viewed from the right side of FIG. 30.
Figure 33:
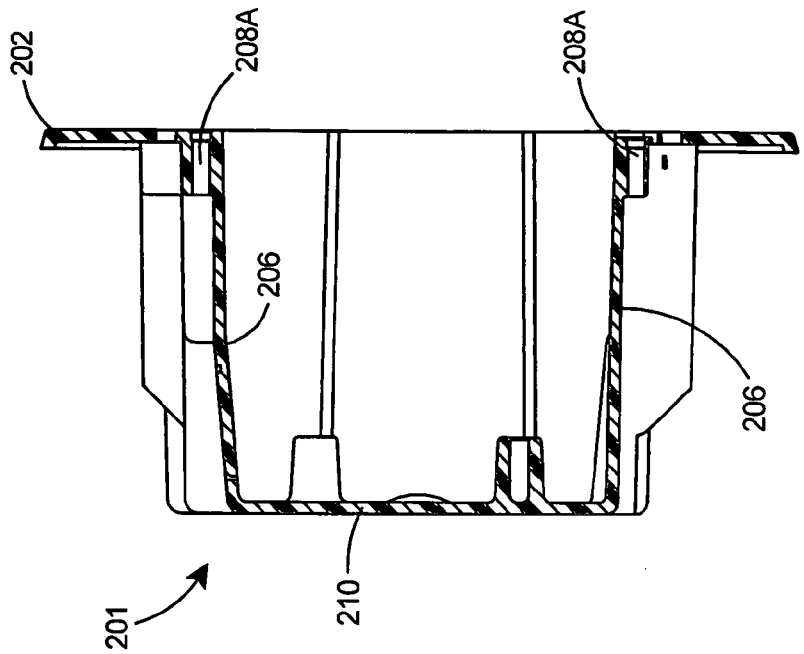
FIG. 33 is a sectional view of the box member taken along line 33-33 of FIG. 30.
Figure 32:
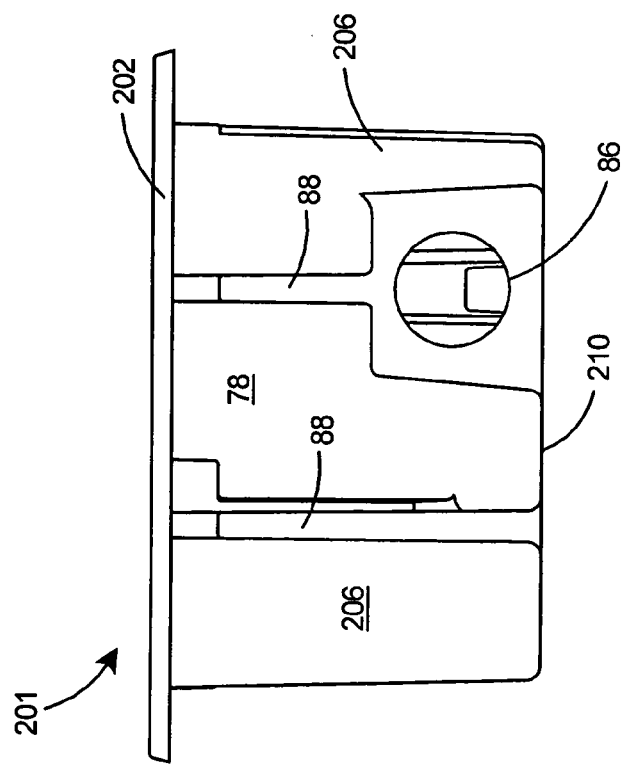
FIG. 32 is a side view of the box member as viewed from the bottom side of FIG. 30.
Figure 34:
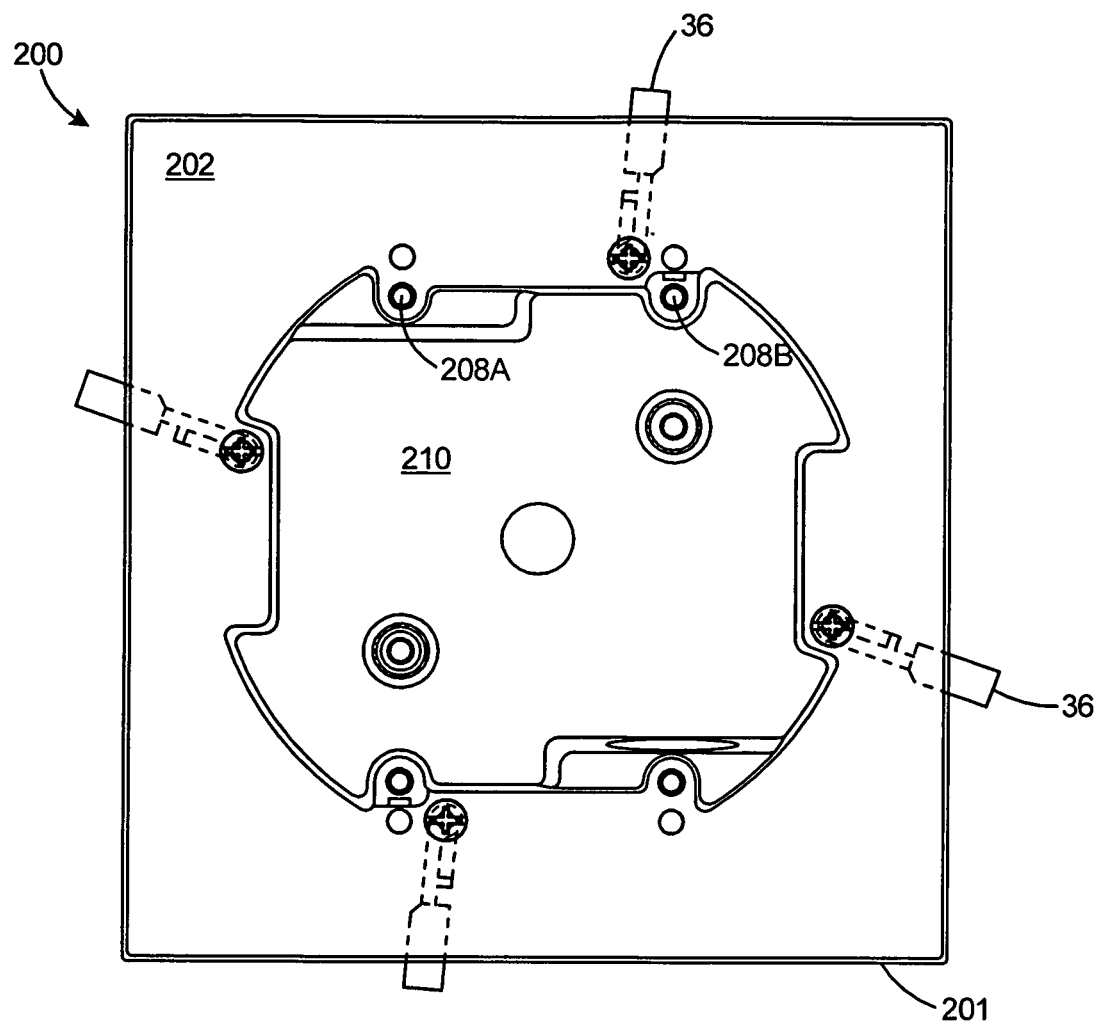
FIG. 34 is a front view of the two gang electrical box of FIG. 28 with the clamp arms in the extended position.

With reference to FIGS. 30 and 31, the circular outer periphery 214 of the sidewall 206 includes an outer diameter D1. It is important to the practice of the invention that no portion of the sidewall 206 extends beyond the circular outer periphery 214. As shown in FIG. 30, the recessed area 78 includes a recessed surface 220 at a second diameter D2, which is a smaller diameter than the outer periphery D1 of the sidewall 206.

Figure 35:
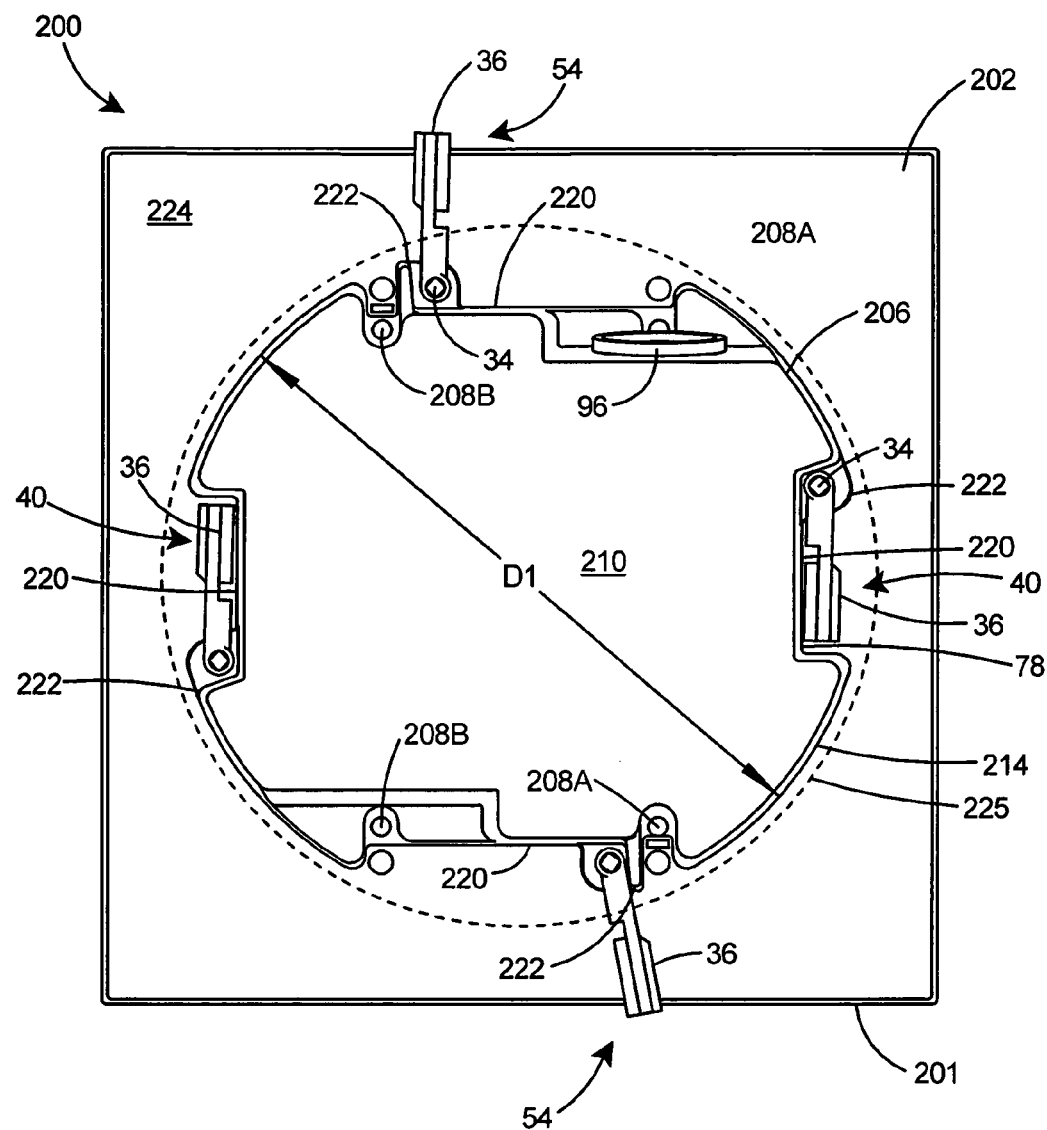
FIG. 35 is a rear view of the two gang electrical box of FIG. 28 with two of the clamp arms in the extended position and two of the clamp arms in the retracted position.

Referring to FIG. 35, there is shown a rear view of the two gang electrical box 200 with two of the clamp arms 36 in the extended position 54 and two of the clamp arms 36 in the retracted position 40. When the mounting fastener 34, as viewed from the front of the electrical box, is turned counterclockwise, recessed surface 220 arrests the counterclockwise rotation of the clamp arm 36 and positions the clamp arm in a retracted position 40. When in the retracted position 40, all portions of the clamp arm 36 are within the outer periphery 214 of the sidewall 206. Conversely, when the mounting fastener 34 is turned clockwise, edge 222 arrests the clockwise rotation of the clamp arm 36 and positions the clamp arm in the extended position 54. Continued clockwise rotation of the mounting fastener 34 will draw the clamp arm 36 toward the rear surface 224 of the plate 202. For the two gang electrical box 200 of the present invention, it is critical that the outer diameter D1 of sidewall 206 be sized slightly less than the diameter made by a conventional hole saw, such as that shown by circle 225. Thus, when a hole equivalent in size to circle 225 is made in the sheetrock covering a wall, and all of the clamp arms 36 are rotated to the retracted position 40, the rearward extending sidewall 206 will easily slip into the hole. The sidewall 206 of the two gang electrical box 200 can further include an electrical fitting 96 therein, the electrical fitting 96 having been inserted in a knockout aperture 86 within the sidewall.

Figure 36:
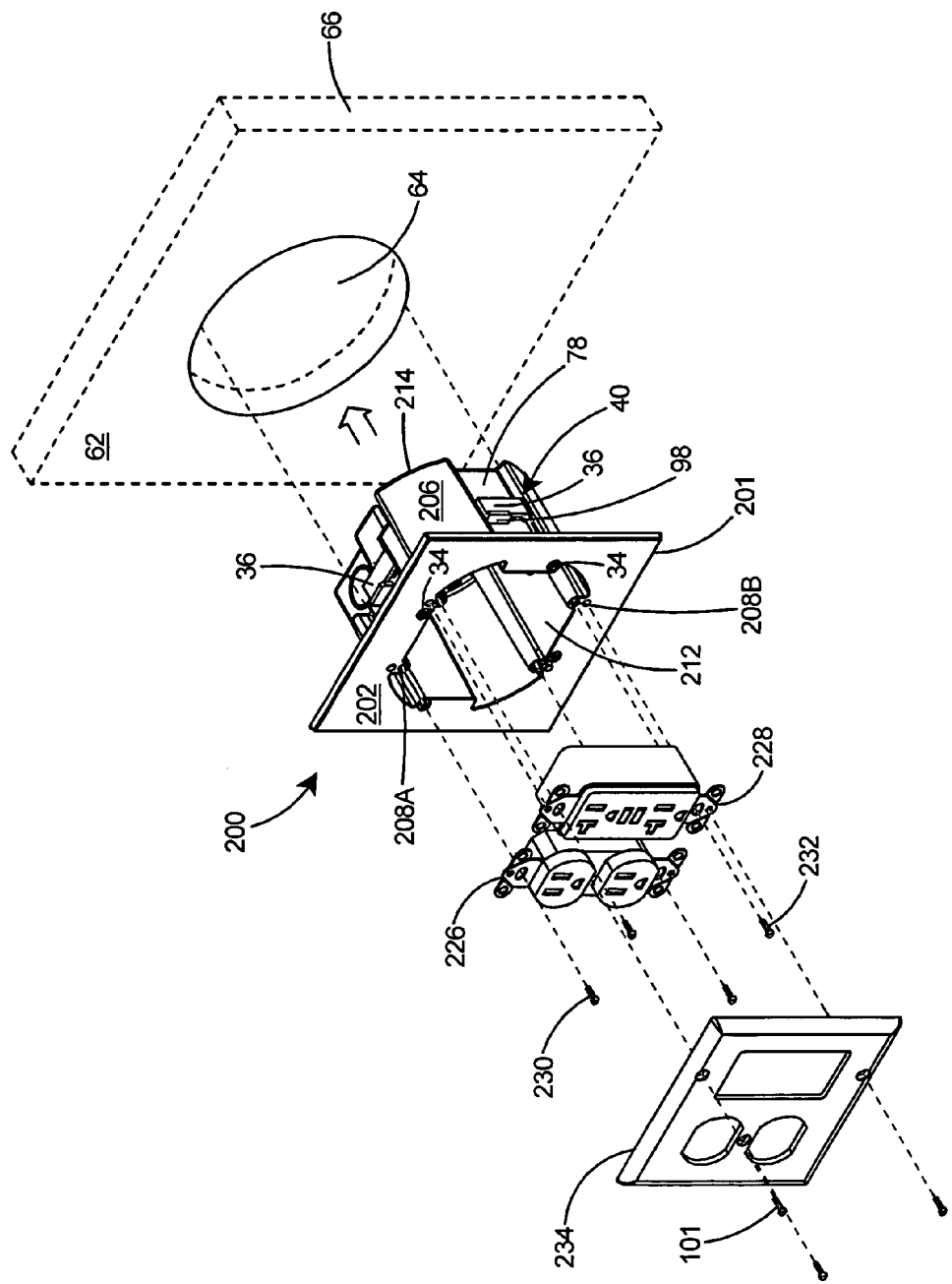
FIG. 36 is an exploded perspective view of the two gang electrical box in alignment to be inserted into a hole in a wall and with a duplex receptacle, a GFCI receptacle, and a cover plate in alignment with the two gang electrical box to be connected thereto.

With reference to FIG. 36, in order to prepare the two gang electrical box 200 for insertion through a hole 64 in a wall, ceiling, or similar structure, the clamp arms 36 are each rotated counterclockwise to the retracted position 40 thereby positioning all portions of the clamp arm 36 within a circle extending through the outer periphery 214 of the sidewall 206. Each clamp arm 36 includes a flat front portion 98 facing the rear surface of the plate 202. To secure the two gang electrical box 200 to a wall 62, an installer simply makes a hole 64 in the sheetrock 66 using a standard hole-saw (not shown) of the proper size. As an example, for two gang electrical box 200 with a sidewall 206 having an outer periphery or outer diameter of 4.19 inch, a standard 4.5 inch hole-saw is used to create a hole 64 of proper diameter for accepting the box member 201. Unexpected results were therefore obtained with the two gang electrical box 200 of the present invention as it demonstrated significant time savings in securing two electrical components to a wall. The significant times savings as compared to a conventional two gang electrical box were obtained from the ease of preparing the wall, as only a circular hole is required to made to prep the wall, and such circular hole can be rapidly made with a standard-sized hole saw.

After being inserted through the circular hole 64 created by the hole-saw, the mounting fasteners 34 are rotated fully clockwise until clamp arms 36 are in their extended positions 54 (see FIG. 28) and rotation is continued until the flat front portions 98 of the clamp arms 36 are drawn tightly against the sheetrock 66 thereby securing the two gang electrical box 200 tightly against the wall 62.

FIG. 36 depicts two electrical components in alignment with the inner cavity 212 including a duplex receptacle 226 and a GFCI 228. The duplex receptacle 226 is secured to paired component bores 208A by a fastener 230 and the GFCI 228 is secured to paired component bores 208B by fasteners 232. A cover plate 234 is then secured to the electrical components and two gang electrical box by fasteners 101. Although a duplex receptacle 226 and a GFCI 228 are depicted on FIG. 36 for illustration purposes, it should be understood that a myriad of electrical components could be installed within the two gang electrical box 200 of the present invention, such as switches, timers, photocells, etc.

The box member 201 portion of the two gang electrical box 200 of the present invention may be constructed of metal or plastic but is most preferably molded in one piece of plastic. The box member 201 can be molded of any suitable plastic including polycarbonate, polyvinylchloride, acrylonitrile butadienestyrene, or a polyolefin.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A two gang electrical box for mounting a plurality of electrical components to a surface comprising:
    a plate including an opening therein;
    a sidewall extending rearward from said plate, said sidewall including an inner surface;
    said sidewall includes a circular outer periphery having a center and an outer diameter;
    said plate extends around the entire outer periphery of said sidewall;
    a plurality of mounting fasteners each including an end extending through said plate, said mounting fastener capable of free rotation within said plate;
    a clamp arm rigidly secured to said ends of said mounting fasteners whereby said clamp arm rotates with rotation of said mounting fastener; and
    two pairs of component bosses extending along said inner surface of said sidewall.

2. The two gang electrical box of claim 1 wherein
    no portion of said sidewall extends beyond said outer diameter of said circular outer periphery.

3. The two gang electrical box of claim 2 including
    a recessed surface on said sidewall for stopping the rotation of said clamp arm in a retracted position whereby said clamp arm is retracted within said outer periphery of said sidewall; and
    an edge on said sidewall for stopping the rotation of said mounting fastener in an extended position whereby said clamp arm is extended outward of said outer periphery of said sidewall.

4. The two gang electrical box of claim 3 wherein
    said recessed surface is located at a second diameter;
    said second diameter is smaller than said outer diameter of said circular outer periphery; and
    said recessed surface stopping counterclockwise rotation of said mounting fastener and positioning said clamp arm in said retracted position.

5. The two gang electrical box of claim 4 wherein
    said edge is located at said outer diameter; and
    said edge stopping clockwise rotation of said mounting fastener and positioning said clamp arm in said extended position.

6. The two gang electrical box of claim 3 including a recessed area in said sidewall for accommodating said clamp arm in said retracted position, said recessed surface is within said recessed area.

7. The two gang electrical box of claim 6 wherein said edge is an integral extension extending outward from said recessed area of said sidewall.

8. The two gang electrical box of claim 1 including
    an inner periphery on said sidewall;
    a mounting boss integral with said inner periphery of said sidewall; and
    an oversize aperture in said mounting boss,
whereby said mounting fastener extends through said oversize aperture.

9. The two gang electrical box of claim 1 wherein said sidewall is closed by a rear wall creating an electrical enclosure therein.

10. The two gang electrical box of claim 9 wherein said plate, said sidewall, and said rear wall form an electrical box with a cavity therein for the receipt of high voltage electrical components.

11. The two gang electrical box of claim 1 wherein said box member includes
    four of said mounting fasteners; and
    said mounting fasteners are located around the periphery of said opening in said plate.

12. The two gang electrical box of claim 1 wherein said clamp arm includes
    a base portion with a bore therein;
    a stem portion extending from said base portion;
    a tab extending laterally from said stem portion; and
    a flat front portion.

13. The two gang electrical box of claim 12 wherein
    said clamp arm is connected to said mounting fastener at said base portion;
    said tab of said clamp arm engages said edge of said sidewall for positioning said clamp arm in said extended position.

14. The two gang electrical box of claim 1 including a channel extending rearward from each of said component bosses along said circular portion of said sidewall.

\* \* \* \* \*